US008251108B2

(12) United States Patent
Koerner et al.

(10) Patent No.: US 8,251,108 B2
(45) Date of Patent: Aug. 28, 2012

(54) FOOD DISPENSING APPARATUS

(75) Inventors: Bruce H. Koerner, Red Wing, MN (US); Richard J. Curtin, Prairie Farm, WI (US); Gordon G. Erickson, River Falls, WI (US); Adino S. Quiboloy, Red Wing, MN (US); Kevin M. Riester, Red Wing, MN (US)

(73) Assignee: Automated Equipment LLC, Red Wing, MN (US)

( * ) Notice: Subject to any disclaimer, the term of this patent is extended or adjusted under 35 U.S.C. 154(b) by 0 days.

(21) Appl. No.: 12/870,698

(22) Filed: Aug. 27, 2010

(65) Prior Publication Data

US 2011/0101022 A1 May 5, 2011

Related U.S. Application Data

(63) Continuation of application No. 11/675,334, filed on Feb. 15, 2007, now Pat. No. 7,802,593.

(51) Int. Cl.
*A47J 47/01* (2006.01)
*A47J 37/12* (2006.01)

(52) U.S. Cl. ................ 141/82; 141/83; 141/98; 222/77; 222/138; 222/146.6; 99/407

(58) Field of Classification Search .................... 141/82, 141/83, 98, 104; 222/77, 135, 138, 146.6; 99/407
See application file for complete search history.

(56) References Cited

U.S. PATENT DOCUMENTS 3,889,724 A * 6/1975 Anthony ........................... 141/1
5,104,002 A 4/1992 Cahlander et al.
5,191,918 A 3/1993 Cahlander et al.
5,224,415 A 7/1993 McFadden et al.
5,282,498 A 2/1994 Cahlander et al.
5,305,615 A * 4/1994 McFadden et al. ............. 62/378
5,353,847 A 10/1994 Cahlander et al.
5,556,000 A 9/1996 Covington et al.
5,778,767 A 7/1998 Rudesill
D402,853 S 12/1998 Fritze et al.
6,125,894 A 10/2000 Fritze et al.
6,131,622 A 10/2000 Fritze et al.
6,305,573 B1 10/2001 Fritze et al.
6,367,777 B1 4/2002 Fritze et al.
(Continued)

FOREIGN PATENT DOCUMENTS

WO WO 91/04933 4/1991
(Continued)

*Primary Examiner* — Gregory Huson
*Assistant Examiner* — Nicolas A Arnett
(74) *Attorney, Agent, or Firm* — Merchant & Gould P.C.

(57) ABSTRACT

A food dispensing apparatus includes a refrigerated cabinet having a dispense aperture, a hopper, an accumulator assembly, a weighing system, and a flap door. The hopper is positioned in the cabinet and configured to hold food articles. The accumulator assembly is positioned vertically below the first hopper and includes an accumulator bin and a door assembly. The accumulator door is positioned in the cabinet and arranged to receive food articles dispensed from the first hopper. The door assembly is configured to retain the food articles in the accumulator bin and is actuatable between an open position and a closed position. The weighing system is configured to determine an amount of food articles held in the accumulator bin. The flap door is positioned adjacent to the door assembly and is movable between a closed position substantially sealing closed the cabinet dispense aperture, and an open position. The flap door automatically closes upon actuation of the door assembly into the closed position.

24 Claims, 27 Drawing Sheets

U.S. PATENT DOCUMENTS

| | | | | |
|---|---|---|---|---|
| 6,481,602 | B1 * | 11/2002 | Fritze et al. | 222/564 |
| 6,701,742 | B2 | 3/2004 | Mack et al. | |
| 6,871,676 | B2 | 3/2005 | Sus et al. | |
| 7,421,834 | B1 | 9/2008 | Doolan | |
| 2005/0051232 | A1 | 3/2005 | Schmoll et al. | |

FOREIGN PATENT DOCUMENTS

| | | |
|---|---|---|
| WO | WO 2006/060328 | 6/2006 |

* cited by examiner

FOOD DISPENSING APPARATUS

CROSS REFERENCE TO RELATED APPLICATION

This application is a continuation of U.S. patent application Ser. No. 11/675,334, filed on Feb. 15, 2007, and entitled DUAL HOPPER FROZEN FOOD DISPENSER AND METHODS, the disclosure of which is incorporated by reference herein in its entirety.

BACKGROUND

1. Technical Field

This invention relates generally to food dispensers, and more particularly relates to temperature controlled food dispensers and related methods.

2. Related Art

Many types of food dispensers are used for dispensing a variety of food products. Frozen French fry dispensers are one example type of food dispenser. Several example French fry dispensers are disclosed in U.S. Pat. Nos. 5,282,498; 5,353,847; and 5,191,918. Each of the foregoing patents discloses a French fry dispenser that includes a main storage bin, a device for moving the fries from the main storage bin into a secondary location, a structure for holding the fries in the secondary location, and a complex apparatus for moving food baskets into position under the secondary storage location.

While the food dispensers disclosed in the Cahlander patents automates the process of dispensing frozen food articles and has been successful in the marketplace, there are several areas in which food dispensers can be improved. First, the complex apparatus used for automatically moving the plurality of baskets into position is often not needed and/or desired by the end-user. Further, in such instances, providing such a complex device introduces expensive equipment into the dispenser and increases the need for maintenance.

Second, the manner in which the food dispenser determines the weight of the articles to dispense may have limited accuracy and increased cost. One way that this shortcoming has been addressed is to use a load cell. However, load cells can be an expensive piece of equipment that adds unnecessary expense. Furthermore, when using a load cell there is no accurate way of determining the amount of product left in the main storage bin. Accordingly, there is a need for an inexpensive and accurate load/weight measuring system.

Third, in some cases an objective of the food dispenser is to limit the defrosting/thawing of the frozen articles or to maintain the frozen articles at a predetermined temperature. The frozen articles to be dispensed from the disclosed apparatus are sometimes easily defrosted or thawed, especially when the food dispenser is positioned near the cooking area. Accordingly, there is a need for a reduction in the defrosting/thawing rate of the frozen articles while in the food dispenser. Furthermore, there is a need for an apparatus that controls the temperature of the frozen articles while in the food dispenser.

Addressing these and other considerations in food dispensers would be an advance in the art.

SUMMARY

A food dispensing apparatus includes a refrigerated cabinet having a dispense aperture, a hopper, an accumulator assembly, a weighing system, and a flap door. The hopper is positioned in the cabinet and configured to hold food articles. The accumulator assembly is positioned vertically below the first hopper and includes an accumulator bin and a door assembly. The accumulator door is positioned in the cabinet and arranged to receive food articles dispensed from the first hopper. The door assembly is configured to retain the food articles in the accumulator bin and is actuatable between an open position and a closed position. The weighing system is configured to determine an amount of food articles held in the accumulator bin. The flap door is positioned adjacent to the door assembly and is movable between a closed position substantially sealing closed the cabinet dispense aperture, and an open position. The flap door automatically closes upon actuation of the door assembly into the closed position.

These and various other advantages and features which characterize the disclosed embodiments are pointed out with particularity in the claims annexed hereto and forming a part hereof. However, for a better understanding of the disclosed embodiments, its advantages and objectives obtained by its use, reference should be had to the drawings which form a further part hereof and to the accompanying descriptive matter, in which there is illustrated and described a preferred embodiment.

BRIEF DESCRIPTION OF THE DRAWINGS

Referring to the drawings wherein like numerals represent like parts throughout the several views.

Figure 1:
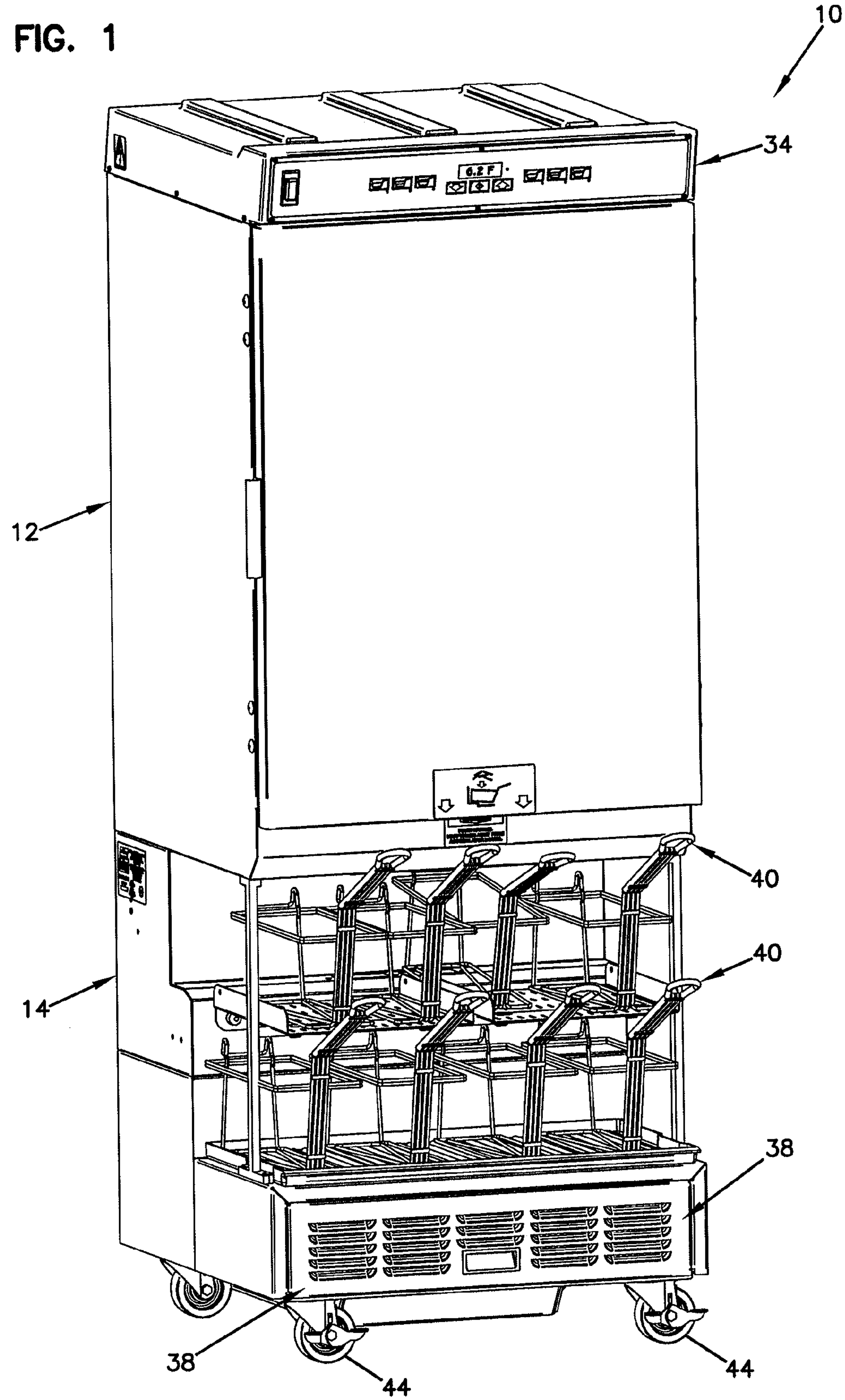
FIG. 1 is a front perspective view of an example of food dispensing assembly in accordance with the principles of the present disclosure.
Figure 2:
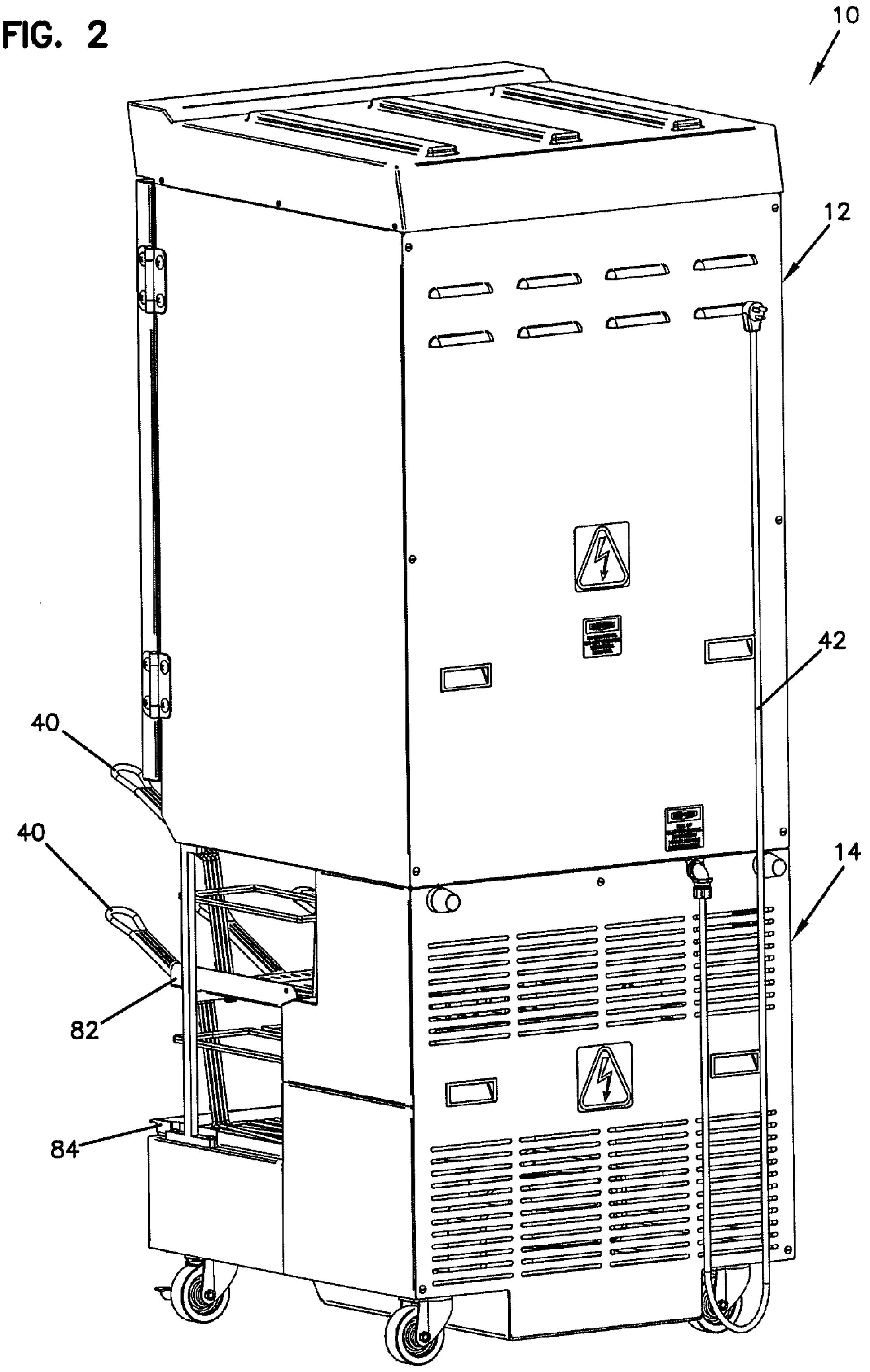
FIG. 2 is a rear perspective view of the food dispensing assembly shown in FIG. 1.

In the following description of the exemplary embodiment, reference is made to the accompanying drawings which form a part hereof, and in which is shown by way of illustration the specific embodiments. It is to be understood that other embodiments can be utilized when structural and other changes can be made without departing from the scope of the present disclosure.

DETAILED DESCRIPTION

The present disclosure relates to an apparatus and methods for dispensing food articles and controlling the temperature of the food articles held in the apparatus. Also disclosed herein are apparatuses and methods for weighing the food articles dispensed from the apparatus and determining when the apparatus is in an empty state. Further disclosed herein are other features and methods that improve ease of use, minimize the incidence of inadvertent dispensing of the food product, and longevity of the dispenser life.

The food article receiving container that receives dispensed food articles can include, for example, a basket, tray, a cooking sheet, or other kitchen utensil/container that is suitable for receiving the dispensed food articles. For ease of description, the food article receiving container will be referred to throughout as a "basket". The food dispenser includes at least one hopper that defines a primary food article storage location. The food dispenser further includes at least one accumulator assembly that defines a secondary food article storage location.

One disadvantage of many dispensers is that they are not refrigerated and therefore cannot reliably maintain a predetermined temperature (or temperature range) of the stored food articles. Although known food-dispensing units can include insulated cabinets, hoppers, accumulators, and other features, as well as control the flow of room temperature air into the insulated areas where the food articles are stored, known food dispensers cannot prevent the stored food articles from undergoing at least a partial thaw prior to being dispensed to a basket.

The food dispenser of the present disclosure includes a refrigeration unit that actively cools the cavity in which the hopper and accumulator assemblies are stored. When dealing with frozen food articles, the food dispensing unit of the present disclosure preferably maintains a target temperature within the freezer cavity of less than 20° F., and more preferably a target temperature between about 0° to 10° F. In other applications that require only refrigeration of the food articles rather than freezing of the food articles, the refrigerated cavity can be maintained at a target temperature of less than 60° F. and preferably a temperature range between about 32° to 40° F. A "predetermined temperature range" is broadly defined as including a specified temperature range, such as 0° to 10° F., or can be temperature range controlled to be maintained at a set point temperature, such as 20° F. A set point (or target) temperature can include a range of temperature degrees above and/or below the set point temperature, for example, 20° F.±1° F. Using a temperature range can be preferable in many embodiments in order to improve efficiency of the cooling device, for example, by reducing the number of cycles of the cooling device.

FIGS. 1-39 illustrate an example food dispensing assembly 10. The food dispensing assembly 10 includes a cabinet 12 and a support stand 14. The assembly 10 further includes first and second hoppers 16, 18, first and second accumulator assemblies 20, 22, flap doors 24, weighing systems 26, drum motors 28, drum shafts 29, and drums 30 that are all positioned and operational within the cabinet 12. A refrigerator system 32, a filter assembly 38, food baskets 40, power cord 42 and casters 44 are supported by or positioned within the support stand 14. A control panel 34 and control system 36 are supported at an upper end portion of the cabinet 12. Further details related to these features will be described with reference to FIGS. 1-39 in the description below.

The Cabinet

The cabinet 12 is now described with reference to FIGS. 1-5, 12 and 18-19. The cabinet 12 defines a refrigerator cavity 50 (see FIGS. 12 and 18), a controller cavity 52 positioned vertically above the refrigerator cavity (see FIG. 5), and an equipment cavity 54 positioned rearward of the refrigerated cavity 50 (see FIG. 3). Refrigerated cavity 50 includes front and rear panels 56, 58, top and bottom panels 60, 62, and first and second side panels 64, 66. The cabinet 12 also includes a front door 68. The panels defining the refrigerated cavity 50 and the front door 68 are typically insulated to help maintain the refrigerated condition with the refrigerated cavity 50.

The cabinet 12 includes a number of apertures or openings. A pair of dispenser apertures 72 are defined in the bottom wall 62 (see FIG. 18) where the dispensed food from inside the refrigerated cavity falls into baskets 40 that are supported on the support stand 14. Two pairs of first and second accumulator shaft apertures 76, 78 (see FIGS. 18 and 19) and a pair of drum shaft apertures (not shown) are defined in the rear wall 58 of the refrigerated cavity 50. The accumulator shaft apertures 76, 78 and drum shaft apertures are sized to permit shafts to extend between motors positioned in the equipment cavity 54 and features such as the accumulator door assemblies and drums that are positioned in the refrigerated cavity 50.

The cabinet 12 includes a raised housing lip 80 (see FIG. 12) that is raised relative to the bottom wall 62. The raised housing lip 80 makes it possible to increase the height of a bottom edge 70 of the door 68 so that the door 68 does not interfere with the baskets 40 supported on the support stand 14 when the door 68 moves between open and closed positions. Alternatively, the cabinet 12 does not include a raised lip so that the bottom edge 70 is positioned at a different height.

Figure 4:
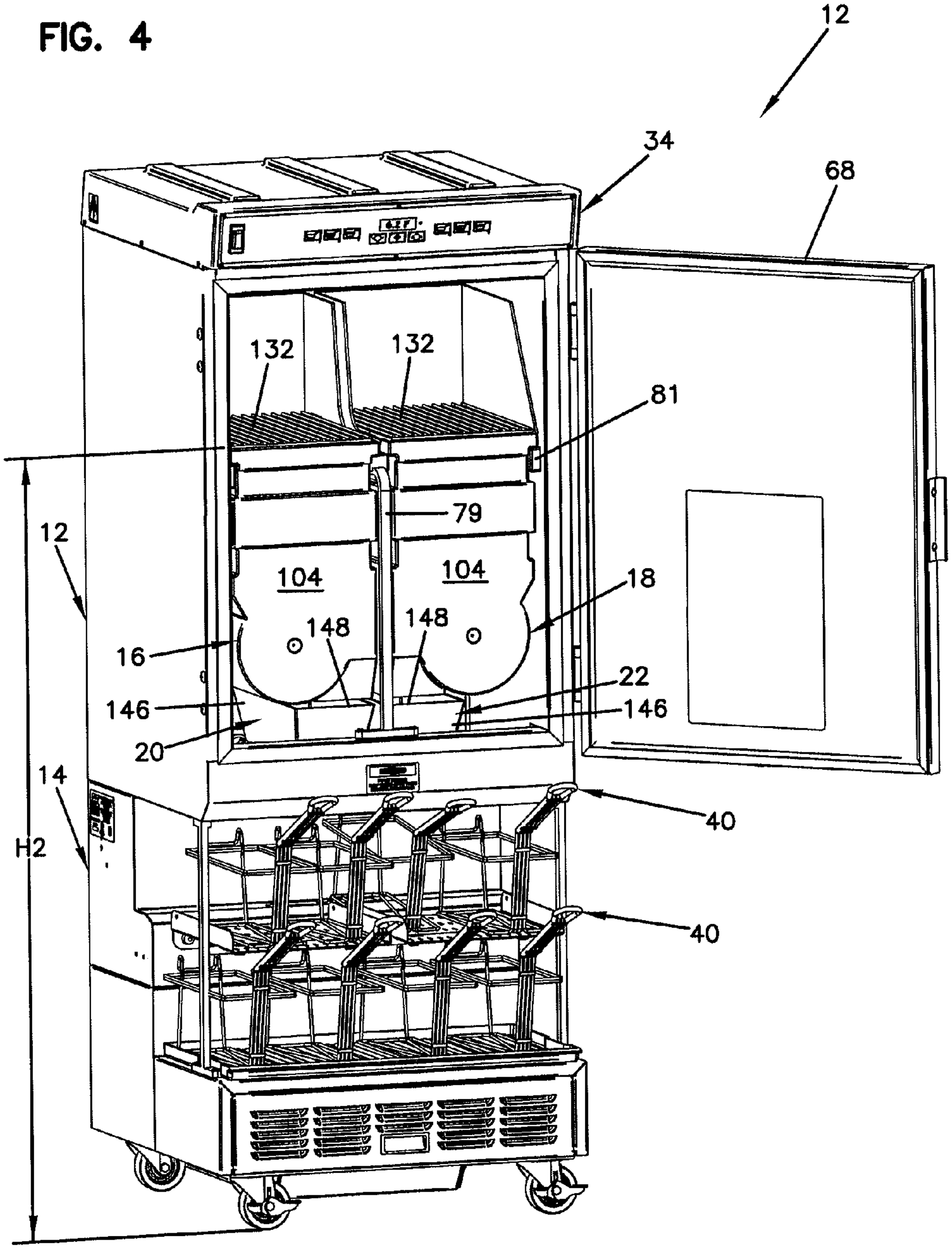
FIG. 4 is a front perspective view of the food dispensing assembly shown in FIG. 1 with the front door in an open position to illustrate features positioned within the refrigerated cavity of the food dispensing assembly.
Figure 5:
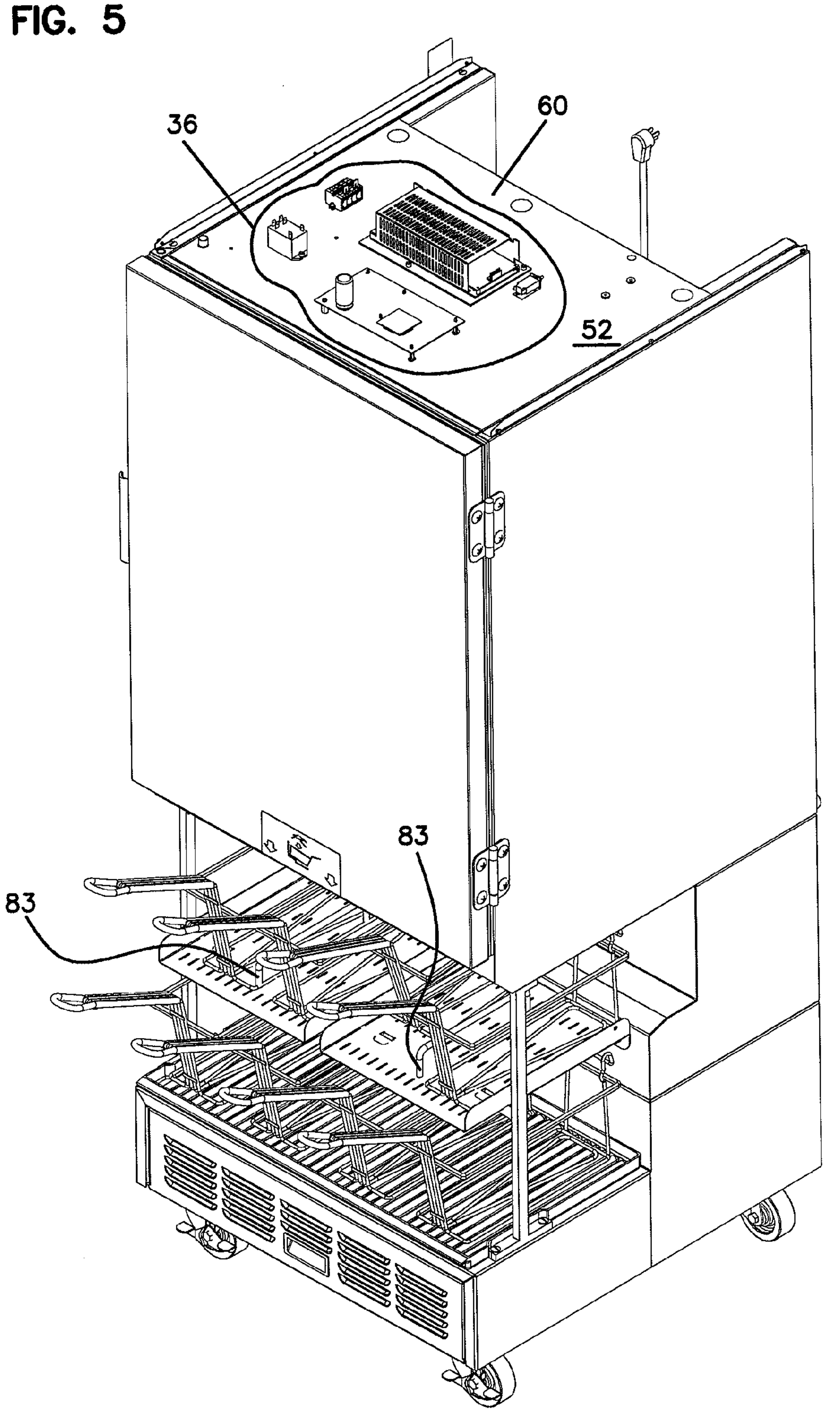
FIG. 5 is a front perspective view of the food dispensing assembly shown in FIG. 1 with a top panel removed to illustrate the control system positioned within a controller cavity of the food dispensing assembly.
Figure 8:
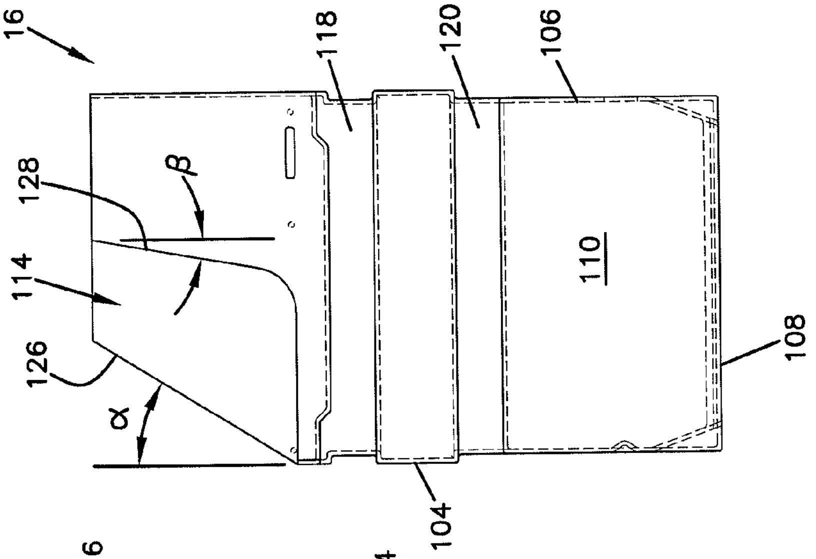
FIG. 8 is a right side view of the hopper shown in FIG. 8.
Figure 7:
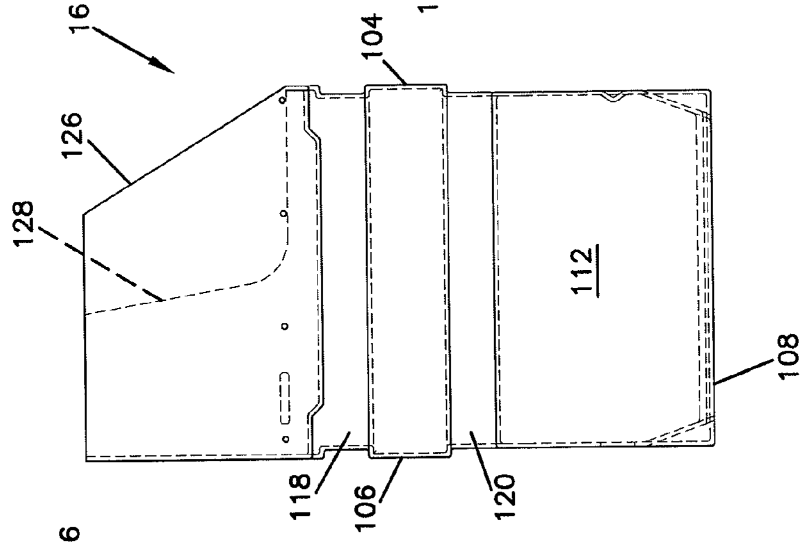
FIG. 7 is a left side view of the hopper shown in FIG. 6.
Figure 6:
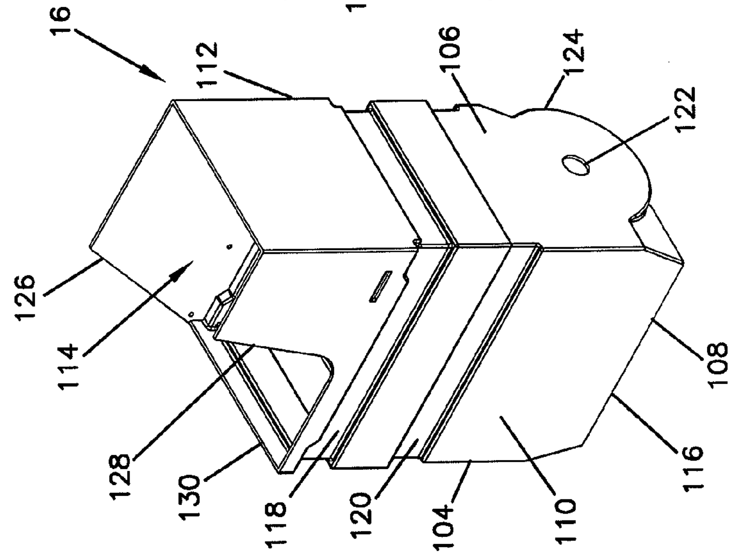
FIG. 6 is a rear perspective view of a first hopper of the food dispensing assembly shown in FIG. 1.
Figure 11:
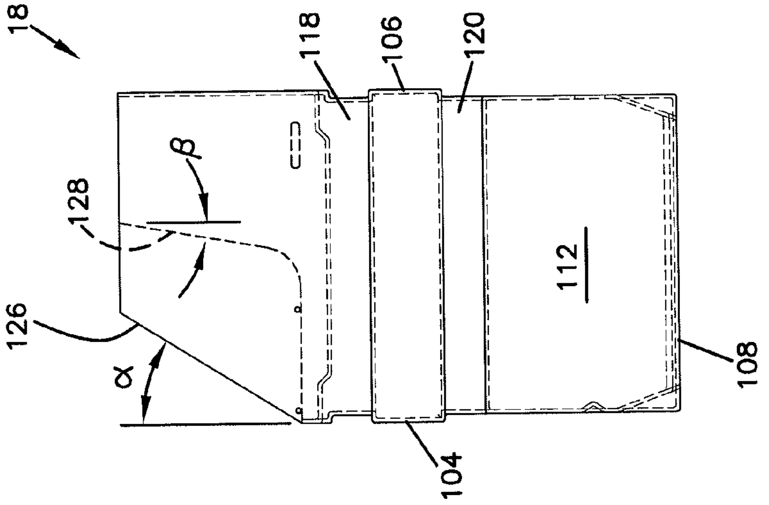
FIG. 11 is a right side view of the hopper shown in FIG. 9.
Figure 10:
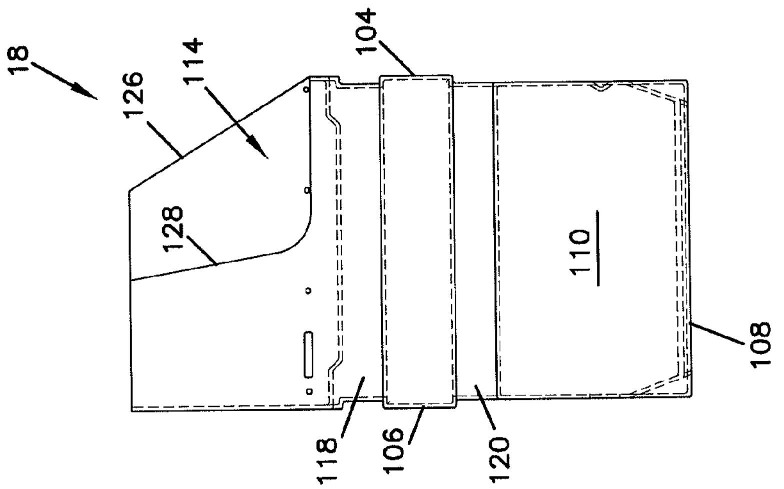
FIG. 10 is a left side view of the hopper shown in FIG. 9.
Figure 9:
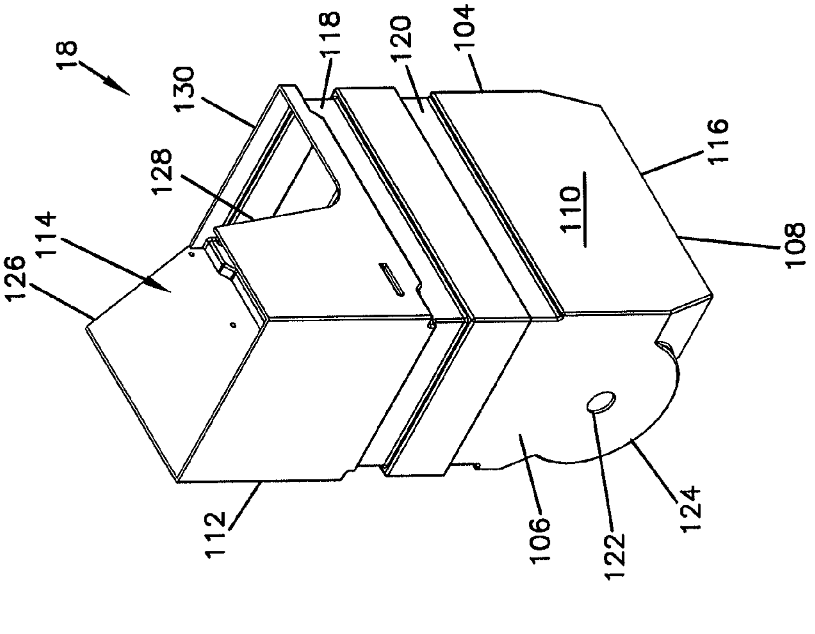
FIG. 9 is a rear perspective view of a second hopper of the food dispensing assembly shown in FIG. 1.
Figure 12:
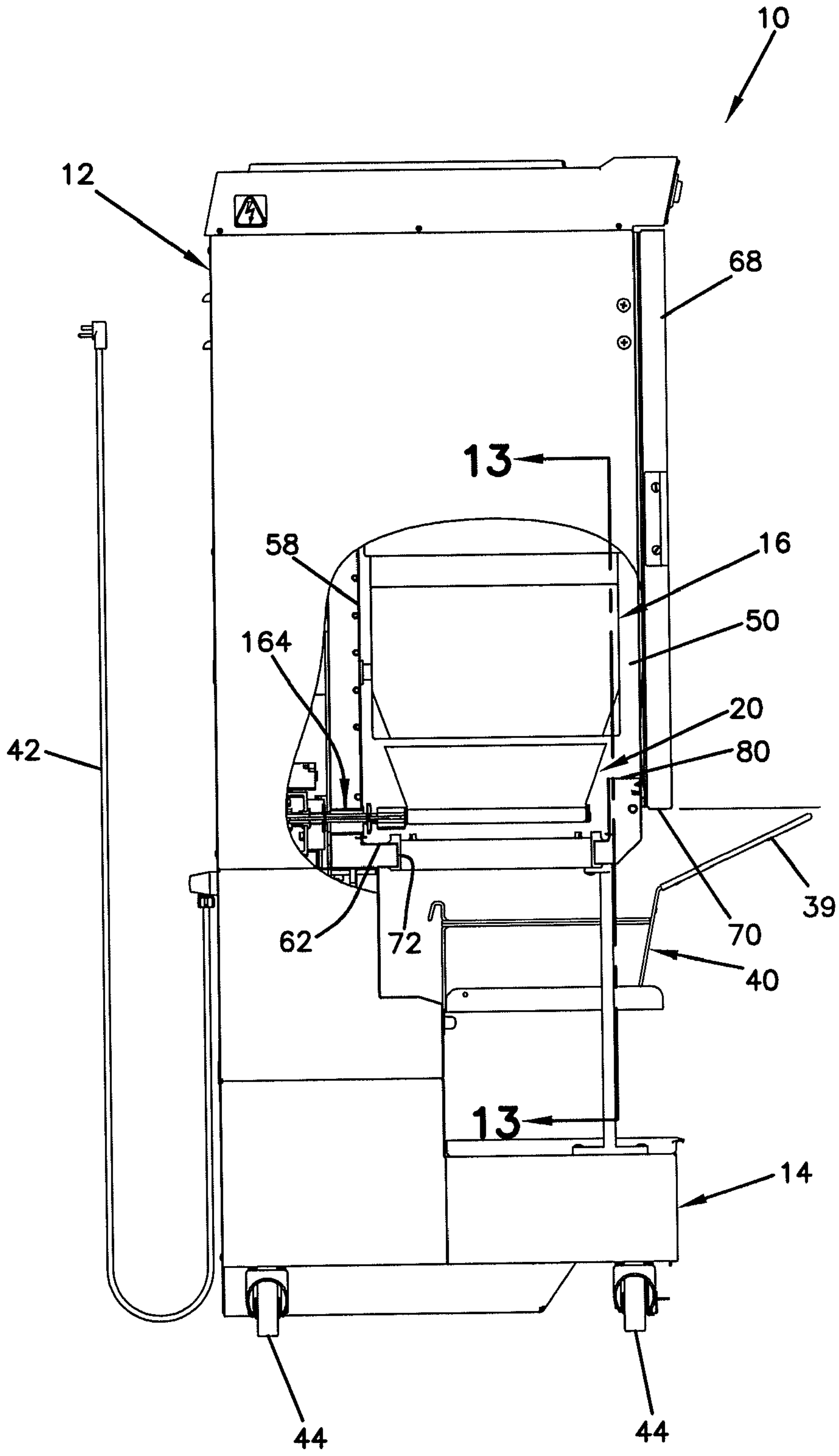
FIG. 12 is a left side view of the food dispensing assembly shown in FIG. 1 with a partial cutout to illustrate a hopper, accumulator, and related features of the food dispensing assembly.
Figure 14:
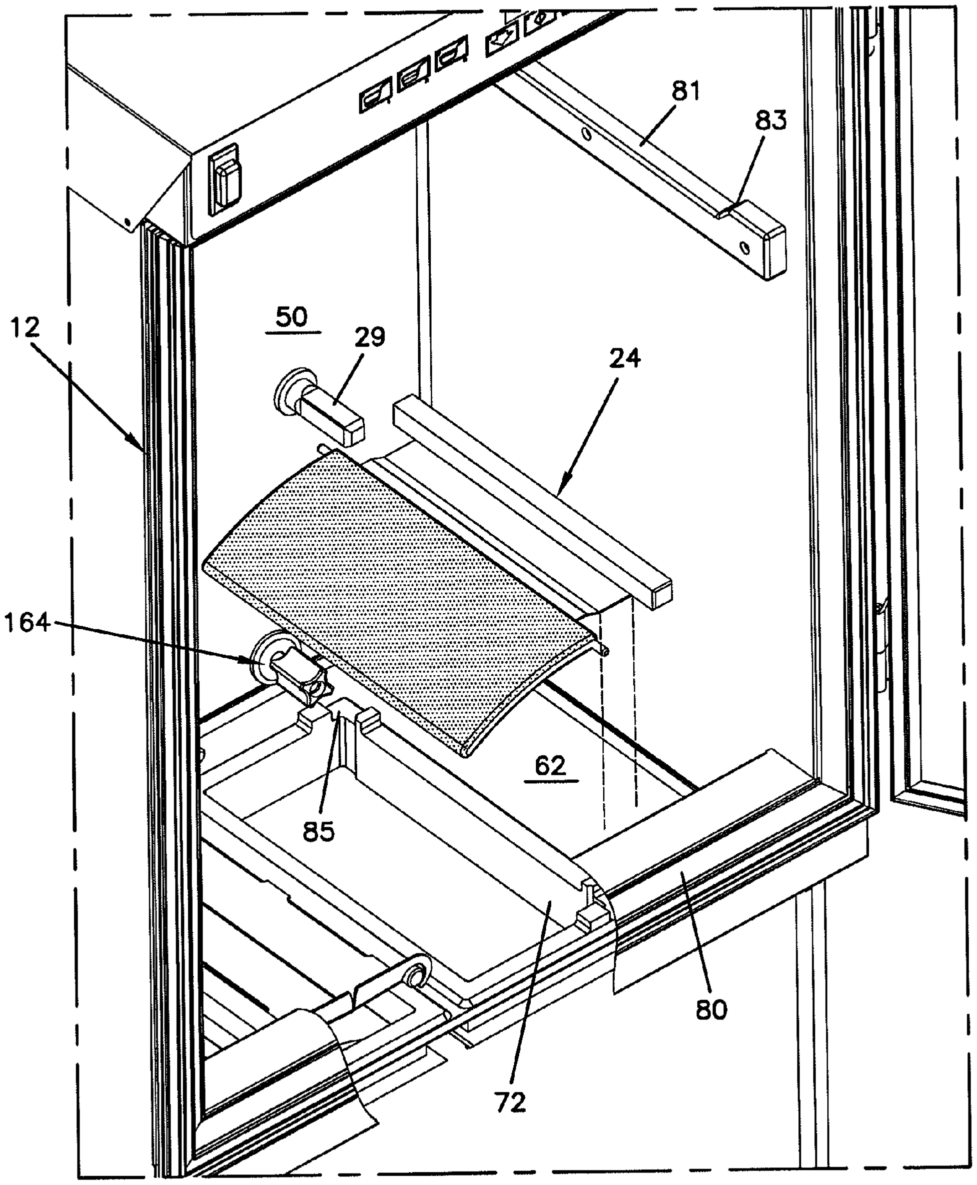
FIG. 14 is a front perspective view of a refrigerated cavity and flap door of the food dispensing assembly shown in FIG. 1.
Figure 15:
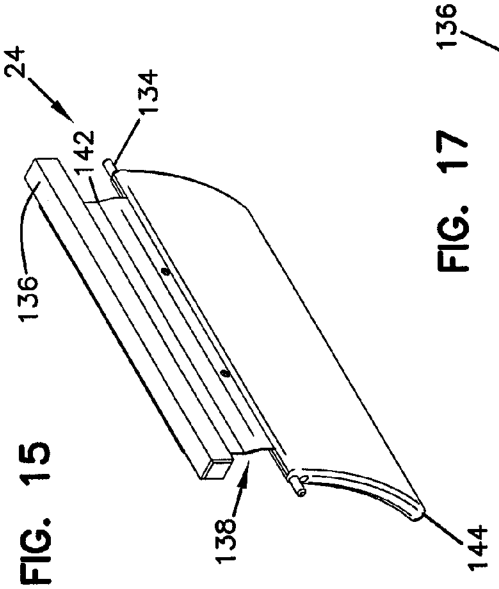
FIG. 15 is a top perspective view of the door flap shown in FIG. 14.
Figure 17:
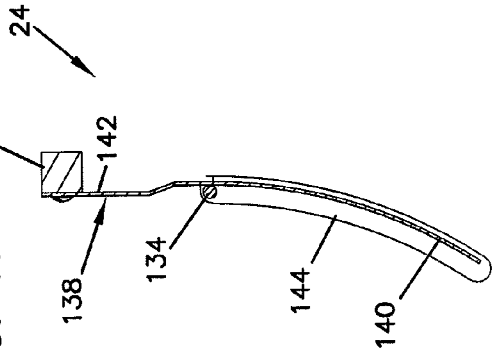
FIG. 17 is a cross-sectional view of the door flap shown in FIG. 16 taken along cross-sectional indicators 17-17.
Figure 16:
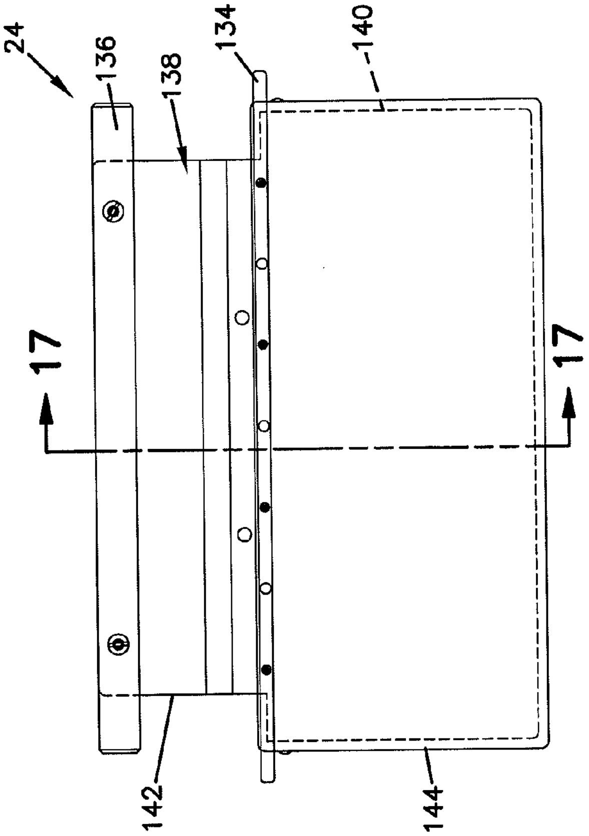
FIG. 16 is a top view of the flap door shown in FIG. 15.

The refrigerated cavity 50 further includes a hopper support stand 79 positioned at a central location in the refrigerated cavity 50 (see FIG. 4) and hopper supports 81 secured to the first and second side walls 64, 66 (see FIGS. 4 and 14). The hopper support stand 79 and hopper supports 81 retain the first and second hoppers 16, 18 in a predetermined vertical position within the refrigerated cavity 50 while permitting the hoppers 16, 18 to be slid into and out of the refrigerated cavity 50 for purposes of, for example, cleaning or maintenance. The hopper supports 81 each include a hopper retainer feature 83 that helps to retain the first and second hoppers 16, 18 in a predetermined horizontal position within the refrigerated cavity 50.

Referring now to FIG. 14, the refrigerated cavity 50 further includes a flap door support seat 85 defined adjacent to the dispenser apertures 72. The flap door support seat 85 permits pivotal movement of the flap door 24 relative to the dispenser aperture 72.

The Support Stand

Figure 36:
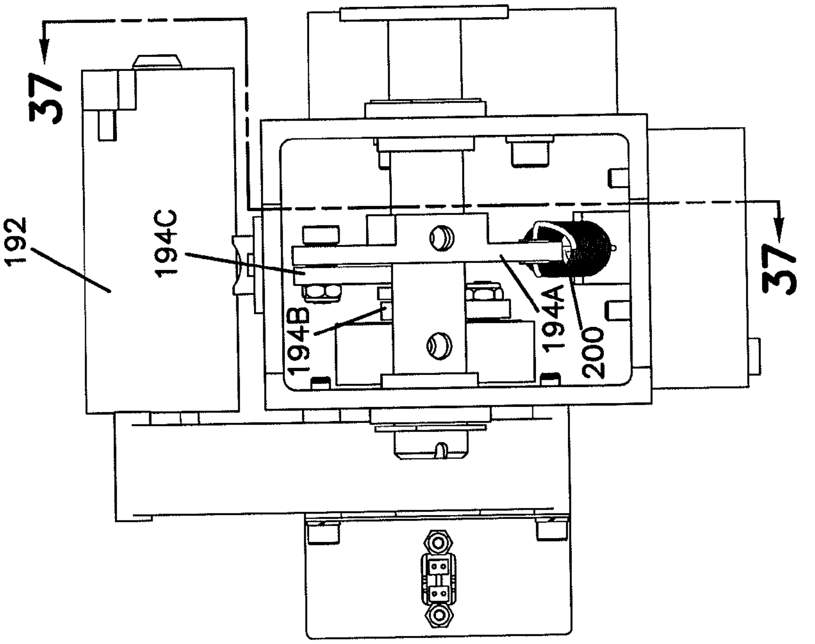
FIG. 36 is a side view of a portion of the features shown in FIG. 33.

The support stand 14 includes a top basket tray 82, a bottom basket tray 84, a stepped shelf 86, a top tray rear wall 88, a bottom tray rear wall 90, and a position sensor 92 (see FIG. 36). The top tray 82 can further include basket dividers 83 that help orient the food baskets 40 relative to the dispense aperture 72 of the refrigerated cavity 50. Each of the top and bottom basket trays 82, 84 can support at least four food baskets 40 of the size shown in the Figures. The illustrated baskets 40 can further include additional structure such as a wire mesh that help retain a volume of food within the food basket. Each food basket 40 includes a handle 39, a front end or front side portion 41, and a bottom side 43.

The support stand 14 is configured with a bottom basket tray 44 positioned at a height H1 relative to the floor upon which the food dispensing assembly 10 is supported. The height H1 typically is in the range of about 10 to about 18 inches. Preferably, the height H1 is preferably at least 12 inches to help maintain adequate food sanitation. Minimizing the height H1 helps reduce the overall height of the food dispensing assembly 10 as well as the height H2 from the floor to the open top end of the first and second hoppers 16, 18 (see FIG. 4).

Figure 18:
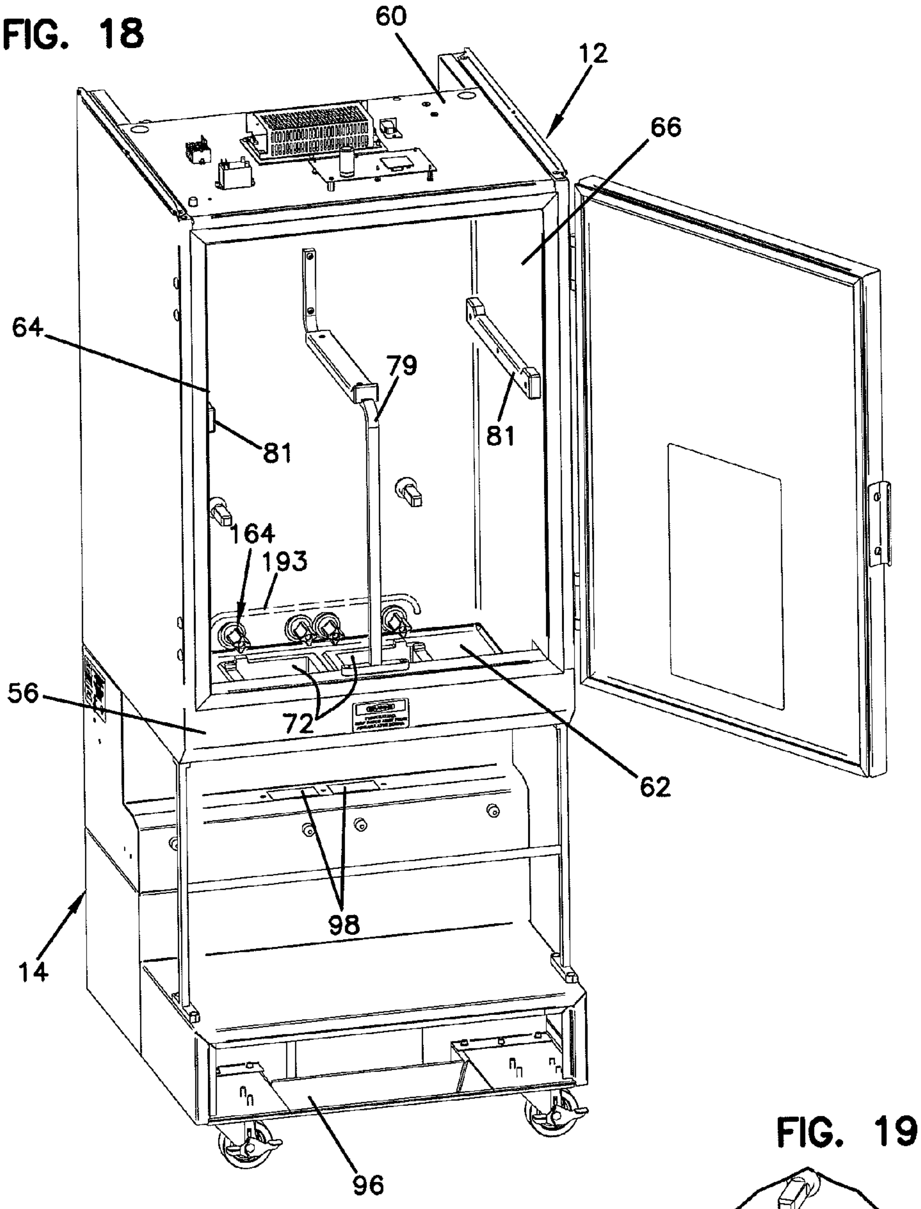
FIG. 18 is a front perspective view of portions of the food dispensing assembly shown in FIG. 10 with the hoppers and accumulator bins removed from the refrigerated cavity.
Figure 19:
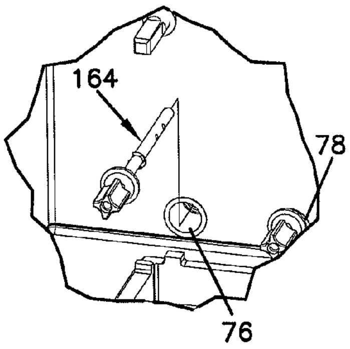
FIG. 19 is a close-up view of a rod assembly removed from an accumulator shaft aperture of the refrigerated cavity.

Referring to FIGS. 18 and 36, the position sensor assembly 92 includes a sensor window 18 positioned along the stepped shelf 86, a sensor 100 positioned beneath the stepped shelf 86, and a sensor bracket 102 that retains the sensor 100 in a fixed position.

The use of the stepped shelf 86 defines two different positions for the food baskets 40: a storage position (see FIG. 12) in which the front end 41 of the food basket 40 engages against a front side of the stepped shelf 86, and a dispense position (see FIG. 36) in which the front end 41 of the food baskets engages the top tray wall 88 and the bottom side 43 of the food baskets is positioned over the sensor window 98 and sensor 100. Typically, the food basket 40 maintains the storage position on the top basket tray 82 when the operator first slides the food basket onto the tray 82 and the food basket moves into engagement with a front surface of the stepped shelf 86. The operator typically must purposely tilt the handle 39 downwards so as to raise the front end 41 of the food basket and slide the food basket 40 in a rearward direction, or lift the whole basket 40 and move it rearward in order to place the food basket 40 in a dispense position as shown in FIG. 36. The operator can release the basket 40 and gravity forces the bottom side 43 of the food basket downward onto the stepped shelf 86 into the sensing range of the sensor 100 so that the sensor can properly identify that the basket 40 is in the dispense position. Thus, the stepped shelf 86 prevents the basket when first slid into the storage position from reaching the sensor and inadvertently dispensing food into the basket. The operator must purposely lift the basket onto the stepped shelf to trigger the dispensing of food.

Figure 38:
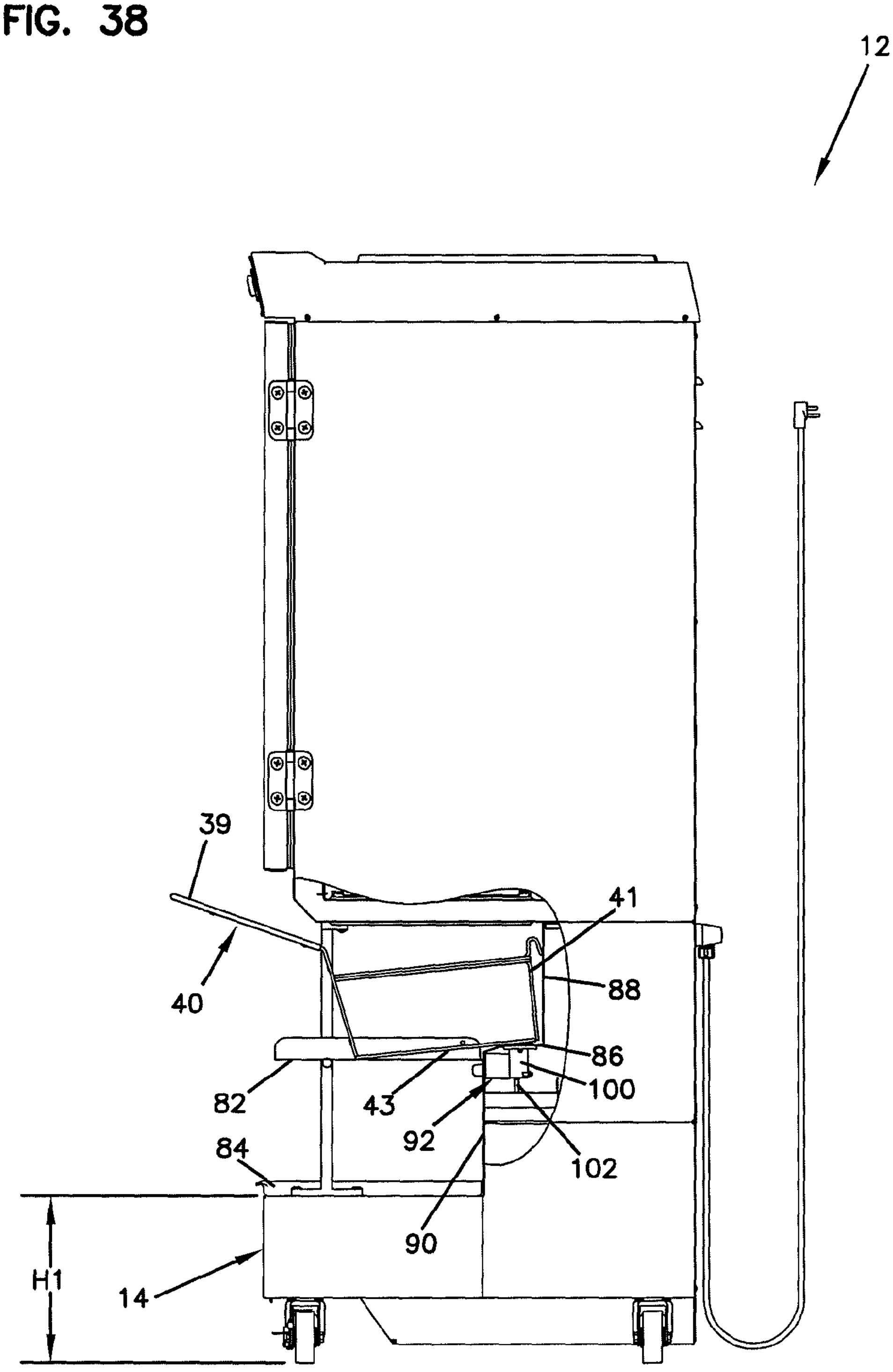
FIG. 38 is a right side view of the food dispensing assembly shown in FIG. 1 with a partial cutout to illustrate the food basket in a dispensing position in which the position sensor is activated.
Figure 39:
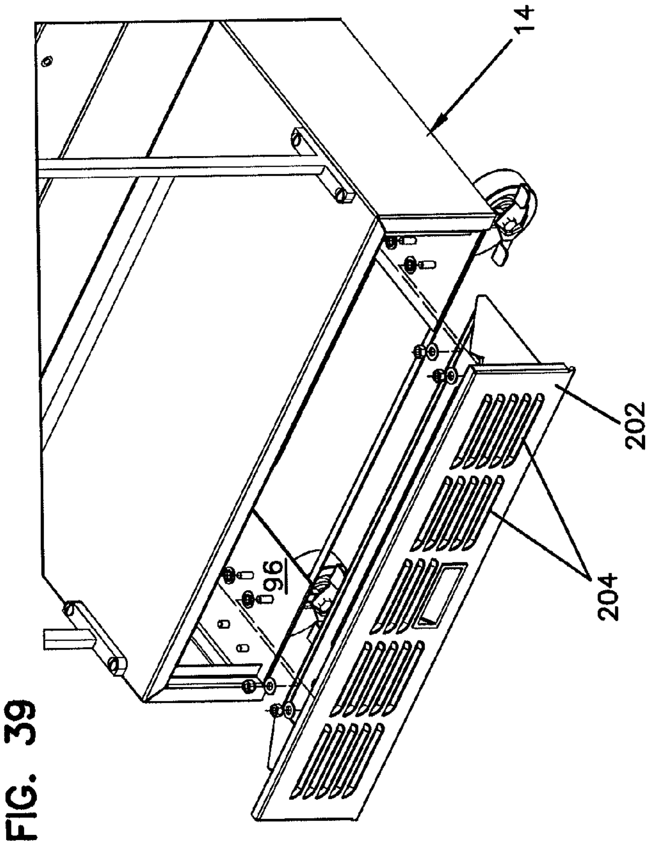
FIG. 39 is an exploded front perspective view of a filtered door of the filter assembly removed from the support stand of the food dispensing assembly.

Positioning the sensor 100 as shown in FIG. 38 addresses shortcomings of other configurations such as a configuration in which the sensor is positioned along the top tray rear wall 88. Positioning the sensor on the rear wall 88 provides the opportunity for the basket to bounce off of the rear wall 88 when the operator moves the food basket 40 into the dispense position so the basket is out of the sensor's range of sensing. As mentioned above, positioning the sensor 100 and sensor window 98 on the shelf 86 utilizes gravity forces to ensure that the basket 40 is maintained within the range of sensing of the sensor 100 when the basket is moved into the dispense position.

Inductive sensors can have advantages in the detection of metallic structures in the environment of food dispensers. One such advantage is that inductive sensors can sense through organic contaminants such as food and shortening (common contaminants in an environment of french fried food dispensers) unlike optical sensors which are blinded by such organic contaminants and therefore must be cleaned on a very regular basis. Inductive sensors can have limitations related to their short range of sensing (e.g., in the range of about 0.25 to about 1.0 inches). Therefore, when using an inductive sensor in an environment such as the food dispensing assembly 10 requires that the food basket must be in almost direct contact with the sensor in order for the sensor to recognize presence of the food basket. In many applications of inductive sensors in food dispensers, the operator must hold the food basket in a close proximity to the inductive sensor in order for the sensor to work effectively. However, by positioning the sensor on the support stand 14 in a position where gravity forces the basket into close proximity with the sensor as described above, the proximity constraints of an inductive sensor are less relevant. The features and functionality of the sensor assembly 92 and the stepped shelf 86 in combination with the sensor assembly 92 can be useful with other types of dispensers besides those shown and described herein with reference to the attached figures.

Figure 3:
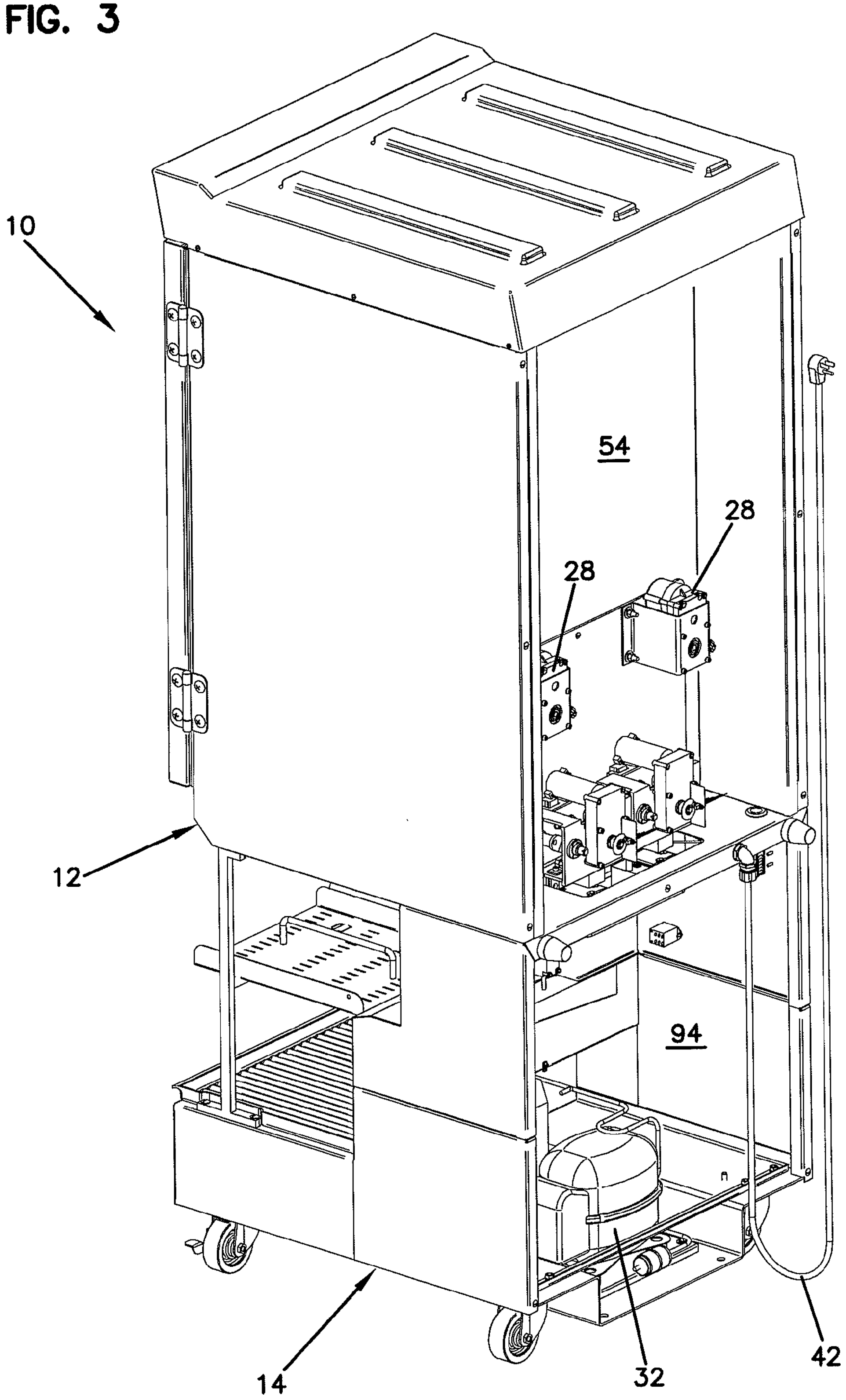
FIG. 3 is a rear perspective view of the food dispensing assembly shown in FIG. 1 with rear panels removed to illustrate features positioned within the food dispensing assembly.
Figure 40:
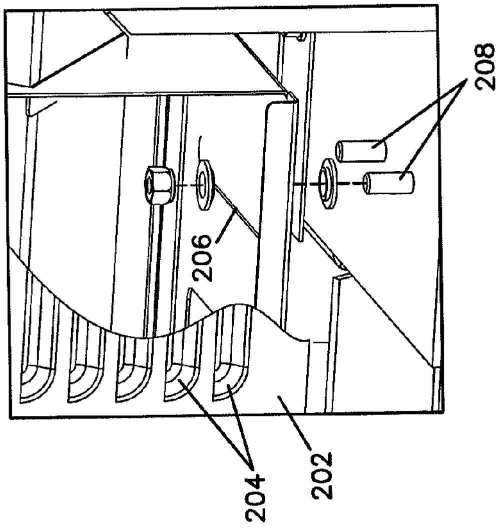
FIG. 40 is a close-up view of the filter assembly door shown in FIG. 37 with a partial cutout to show the alignment of parts.
Figure 41:
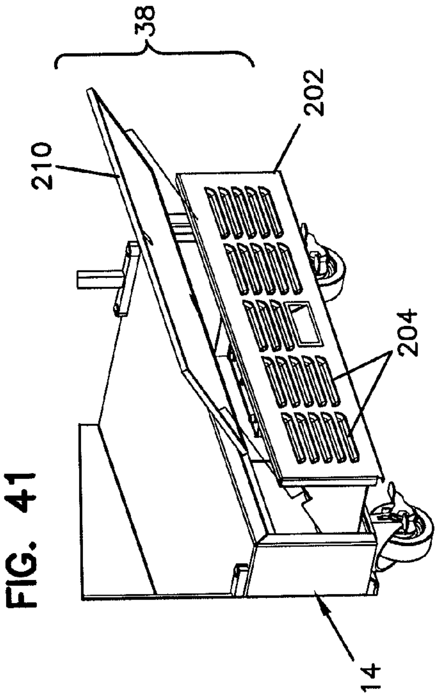
FIG. 41 is another exploded front perspective view of the filter assembly with a filter aligned for insertion into the door.

The support stand 14 further defines a housing 94 positioned rearward of the top and bottom tray rear walls 88, 90 (see FIG. 3). The housing 94 is sized to house the refrigeration system 32. The support stand 14 further defines an air intake chamber 96 that extends from the housing 94 to a front side of the food dispensing assembly 10 (see FIG. 37). The filter assembly 38 is positioned at an intake end of the air intake chamber 96 along the front side of the food dispensing assembly 10. The filter assembly 38 will be described in further detail below with reference to FIGS. 39-41.

The refrigeration system 32 can include a plurality of cooling coils (not shown) that extend from the housing 94 into or adjacent to the rear, top, bottom and first and second side walls 58, 60, 62, 64, 66 of the refrigerated cavity 50. The refrigeration system 32 is configured to maintain a predetermined temperature condition within the refrigerated cavity 50. At least one temperature sensor (not shown) can be positioned within the refrigerated cavity 50 to monitor the temperature condition within a refrigerated cavity 50. The position of the temperature sensor in the cavity 50 can vary. The control system 36 can use feedback from the temperature sensors to determine when to activate and the duration of activation of the refrigeration system 32. The predetermined temperature range can be set by an operator via the control panel 34.

The Hoppers

The hoppers 16, 18 are now described with reference to FIGS. 4 and 6-11. Each of the hoppers 16, 18 includes front, rear, bottom and first and second side panels 104, 106, 108, 110, 112. The front and rear panels 104, 106 and first and second side panels 110, 112 define a top food aperture 114 at a top end portion of the hoppers 16, 18. A bottom food aperture 116 is defined at a bottom end portion of the hoppers 16, 18 to provide for the dispensing of food from within the hoppers to the accumulator assembly positioned below the hoppers 16, 18 in the refrigerated cavity 50.

The hoppers 16, 18 further include top and bottom support recesses 118, 120 that extend along at least portions of the first and second side panels 110, 112. The top support recess 118 includes a stop portion 119 configured to engage the hopper retainer feature 83 on the bin support 81. The hoppers 16, 18 also include a drum recess 124 that is sized to receive the drums 30 (see FIG. 13). A food diverter 125 is positioned within each of the hoppers 16, 18 to help direct food into the bottom food aperture 116 as the drum 30 rotates within the hoppers 16, 18.

Each of the hoppers 16, 18 includes a first panel cutout 126 on the first side panel 110 of the hopper, a second panel cutout 128 on the second side panel 112 of the hopper, and a third panel cutout 130 along the front panel 104 of each of the hoppers 16, 18. The cutouts 126, 128, 130 provide for a reduced minimum height of the top food aperture 114 at a location along the front side of the hopper. The reduced height position of the top food aperture 114 provides improved ease when filling the hoppers 16, 18 with food by an operator standing at the front side of the food dispensing assembly 10. Because the first panel cutouts 126 of the hoppers 16, 18 are arranged adjacent to each other when the hoppers 16, 18 are positioned in the cabinet 12, there is additional space provided for the operator to position a bag or other container of food, or a portion of the operator's body (e.g., the operator's arm) within the refrigerated cavity 50 while filling either one of the hoppers 16, 18. The configuration of the second panel cutout 128 can enhance maneuverability and handling of the hoppers 16, 18 prior to, during and after positioning of the hoppers 16, 18 in the refrigerated cavity 50, and improved ease when filling the hoppers with food. The cutouts 126, 128, 130 can have various shapes and sizes. For example, the angles β, α shown in FIGS. 7, 8, 10 and 11 can be modified to alter the shape and size of the cutouts.

The top portion of each of the rear and first and second side panels 106, 110, 112 that remains after the first and second cutouts 126, 128 have been removed provides for stacking of food in a rear portion of the hoppers to maximize the volume of food that the hoppers 16, 18 can hold. Typically, the maximum height H2 (see FIG. 4) of the top food aperture 114 at the front panel 104 is no greater than about 40 to 60 inches, and more preferably about 57 inches.

An optional food shelf 132 can be positioned in each of the hoppers 16, 18 (see FIG. 4). Shelf brackets can be positioned on internal or external surfaces of the hoppers 16, 18 to support each shelf 132. In other configurations, the hoppers 16, 18 can include apertures into which mounting brackets for each shelf 132 can extend to support the food shelf in a desired orientation within the hopper. Preferably, each food shelf 132 is removably mounted so as to provide an optional food support surface in the hoppers 16, 18 that can be installed or removed as desired. The food shelf 132 is shown with a size that covers substantially all of the top food aperture 114 of the hoppers 16, 18. In other embodiments, the food shelf 132 can extend across only portions of the top food aperture 114. Further, the food shelf 132 can be secured to the hopper with a pivotal mounting or other attachment configuration that provides for moving the food shelf into an inoperable raised position while re-filling the hoppers 16, 18 without completely detaching the food shelf from the hoppers. Using a separate food shelf for each hoppers in a two hopper configuration permits one hopper to be used to dispense food while the other hopper is used with a food shelf 132 to store a different type of food.

A particular advantage of food dispensing assembly 10 is that it includes two hoppers. There are a number of limitations related to the use of a single hopper food dispenser. One such limitation relates to the volume of food that can be dispensed within a given time period for a single hopper configuration. In one type of single hopper food dispenser, the time required for dispensing two baskets of food is about 12 to 20 seconds. When using a two hopper dispenser, the user can dispense food from two sources within the dispenser, thus providing twice the throughput of food volume as compared to a single hopper dispenser. In one example two hopper food dispenser, two baskets of food can be dispensed in 3 to 5 seconds.

Another limitation of single hopper designs relates the ease of handling the relatively large and heavy hopper in a single hopper dispenser. In a two hopper dispenser, the hoppers can each be smaller and lighter while provide the same or greater food carrying capacity, making it easier and safer for a user to handle the hoppers.

A further limitation of single hopper designs relates to the down time associated with refilling a single hopper dispenser. While refilling a single hopper dispenser, the dispenser cannot be operated to dispense any product. In contrast, a two hopper dispenser can still be operated to dispense food articles when one of the dispensers is empty. This makes it possible for the user to have added flexibility as to when the empty hopper is refilled. The notice of one of the hoppers being empty can also serve as a notice of low food level in the second hopper.

Many types of food dispensers include only a single hopper so that only a single type of food article can be dispensed at a time. As a result, there would typically be a need for separate food dispensers for each individual type or shape of food. For example, one food dispenser might be dedicated to vegetable products and a separate food dispenser dedicated to protein products. Because some types of food require more regular cleaning and sanitation of the food dispenser, require storage at a specific temperature (or within a specific temperature range), or must be dispensed at a certain rate or a certain quantity, known food dispensers are often specialized for a certain type of food. The food dispensing assembly of the present disclosure has the added versatility of dispensing at least two different food items using a single food dispensing unit.

Although the illustrated embodiment includes two separate hoppers, other embodiments can include only a single hopper within a refrigerated cabinet. In yet further embodiments, the food dispensing assembly can include three or more hoppers positioned within a refrigerated cabinet that possess the advantages of the food dispensing assembly 10 described above. In yet further examples, aspects of the food dispenser assembly disclosed herein can be used in conjunction with an automated basket system such as the system disclosed in U.S. Pat. No. 6,125,894, or with a system that adjusts for various densities of food articles as disclosed in U.S. Pat. No. 6,305,573, which references are incorporated herein by reference in their entirety.

The Accumulator Assemblies

Each of the accumulator assemblies 20, 22 includes an accumulator bin 146 (see FIGS. 4, 12, and 13), a first and second door assemblies 152, 154 (see FIGS. 13 and 20-25), and a set of rod assemblies 164 (see FIGS. 12, 19-22 and 26-35). An accumulator bin 146 is associated with each of the first and second hoppers 16, 18. The accumulator bins 146 are separate pieces from the bins 16, 18, which are typically mounted within the refrigerated cabinet 50 separate from mounting of the hoppers 16, 18 in the refrigerated cabinet 50. Separating the hoppers 16, 18 from the accumulator bins 146 makes it possible to reduce the size of the opening into the refrigerated cavity 50 and reduce the size of the door 68. Providing for a reduced size of the opening in the front panel 56 permits use of the raised housing lip 80, which, as described above, permits increasing the height of the bottom edge 70 of the door 68 so as to maximize the height of the food baskets 40 while minimizing the height H2 of the top food aperture 114 of the hopper 16, 18.

Each of the accumulator bins 146 includes a top opening 148, a bottom opening 150, and a plurality of panels that define a volume of space that retains food products dispensed from the hoppers 16, 18 while the dispensed food is being weighed prior to dispensing the food into the food baskets 40. The accumulator bins 146 are configured to rest upon or otherwise be supported by the first and second door assemblies 152, 154. As will be described below, the first and second door assemblies 152, 154 are coupled to a weighing system that weighs the food held within the accumulator bin 146.

Figure 25:
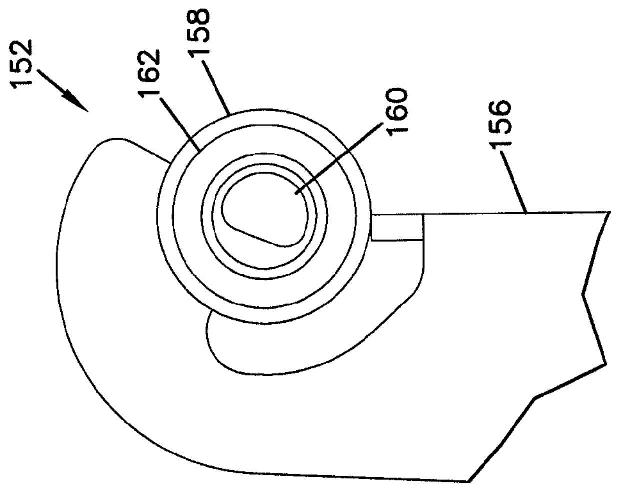
FIG. 25 is a close-up end view of the door assembly shown in FIG. 23.
Figure 23:
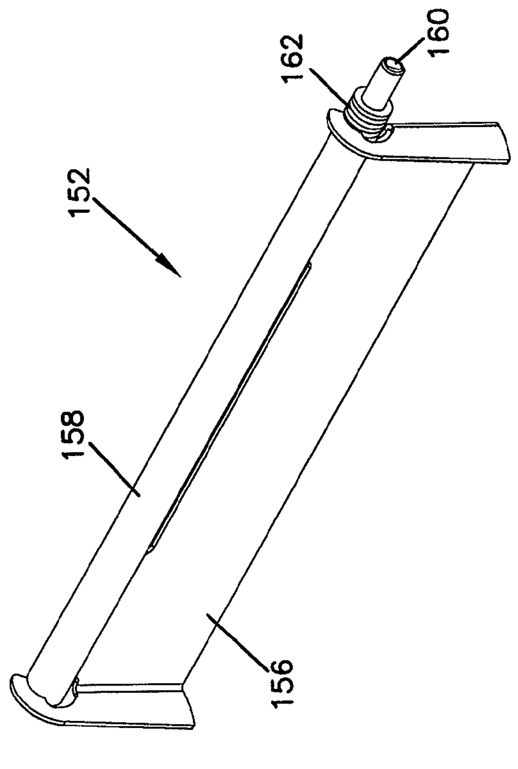
FIG. 23 is a perspective view of a first door assembly of one of the accumulator assemblies.
Figure 24:
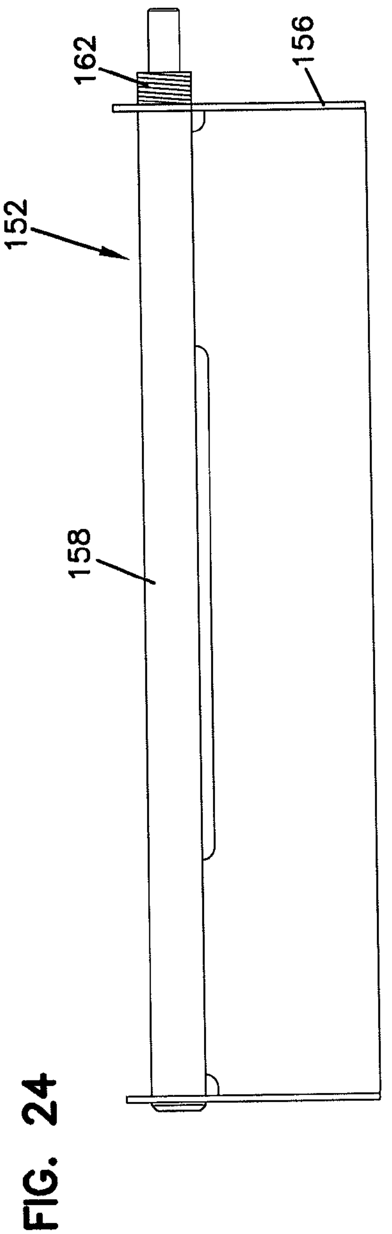
FIG. 24 is a top view of the door assembly shown in FIG. 23.

Each of the first and second door assemblies 152, 154 includes a door 156, a shaft 158, a keyed bore 160 at one end of the shaft 158, and a threaded portion 162 adjacent the keyed bore 160 (see FIGS. 23-25). The keyed bore 160 and threaded portion 162 are sized for engagement with the features of the rod assemblies 164, as described below, for connection of the door assemblies 152, 154 to actuating motors and a weighing system that provide opening and closing the doors 156 and weighing of food accumulated in the accumulator bins 146. The doors 156 associated with each of the first and second door assemblies 152, 154 rotate in opposite directions between a closed orientation as shown in the door assembly 154 in FIG. 13, and the open position of the door assembly 152 shown in FIG. 13. Preferably, the doors 156 rotate between the open and closed position simultaneously. Simultaneous operation of the doors 156 provides for an even release of food held within the accumulator bin 146 into the food basket 40.

Figure 13:
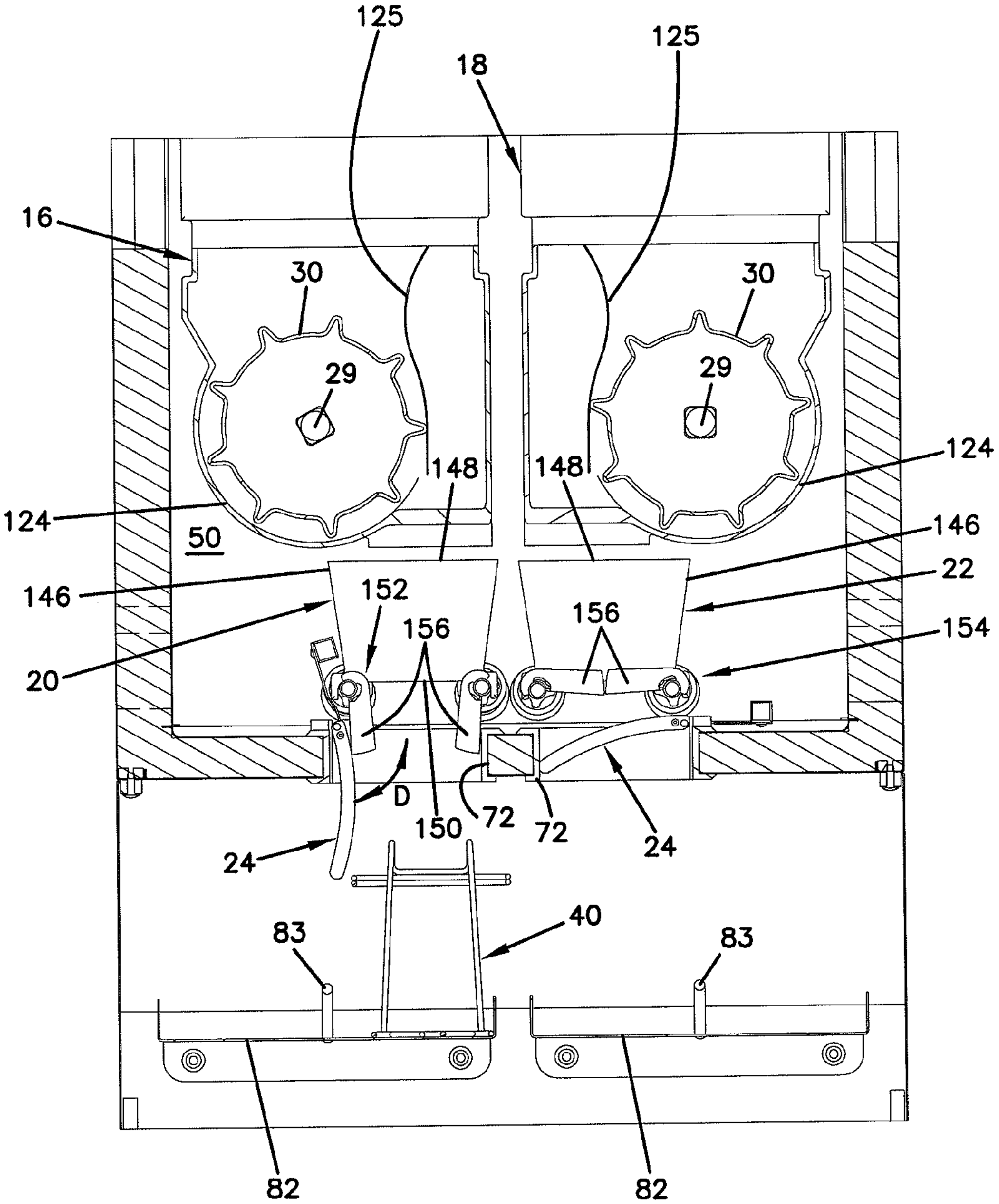
FIG. 13 is a partial front cross-sectional view taken along cross-sectional indicators 13-13 in FIG. 12.

As further shown in FIG. 13, operation of the doors 156 from the closed position to the open position moves the flap door 24 between a closed position sealing closed the dispense aperture 72 of the refrigerated cavity 50, and an open position in which the dispense aperture 72 is open to permit food to move from the accumulator bin 146 into the food basket 40. The door 156 that engages the flap door 24 as well as the flap door 24 itself rotates in the direction D (see FIG. 13) between the open and closed positions. The doors 156 are shown in FIG. 13 rotating through an angle of about 90° between the closed position (aligned with a horizontal plane) and open position (aligned with a vertical plane). In other embodiments, the rotation angle can be greater or less than 90° so long as one of the doors 156 opens a distance sufficient to displace the flap door 24 out of the path of food being dispensed from the accumulator bin 146. The flap door 24 will be described in further detail below.

Figure 26:
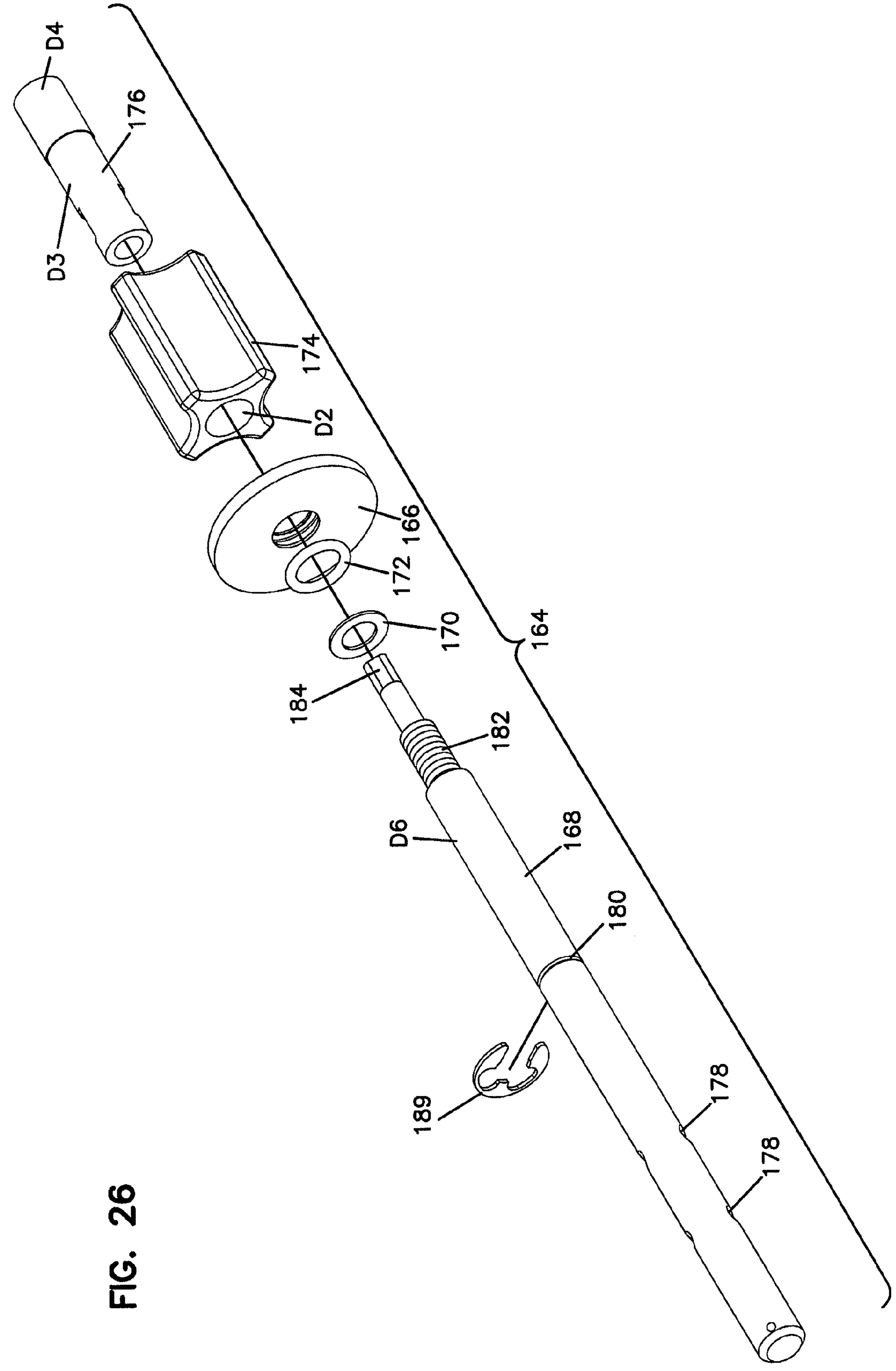
FIG. 26 is an exploded perspective view of a rod assembly.

A separate rod assembly 164 is associated with each of the first and second door assemblies 152, 154. Referring to FIG. 26, each rod assembly 164 includes an inner collar member 166, a rod 168, a washer 170, an O-ring 172, a coupler nut 174, and a coupler 176. An additional outer collar member 195 (see FIGS. 34-35) can be held in position with a lock ring 189 on the rod 168 at a position inside the equipment cavity 54.

Figure 30:
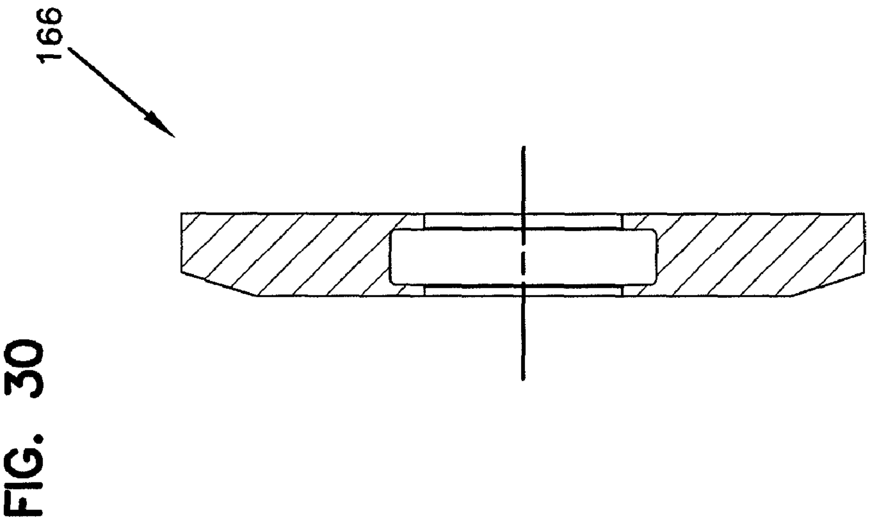
FIG. 30 is a cross-sectional view of the collar member shown in FIG. 29 taken along cross-sectional indicators 30-30.
Figure 29:
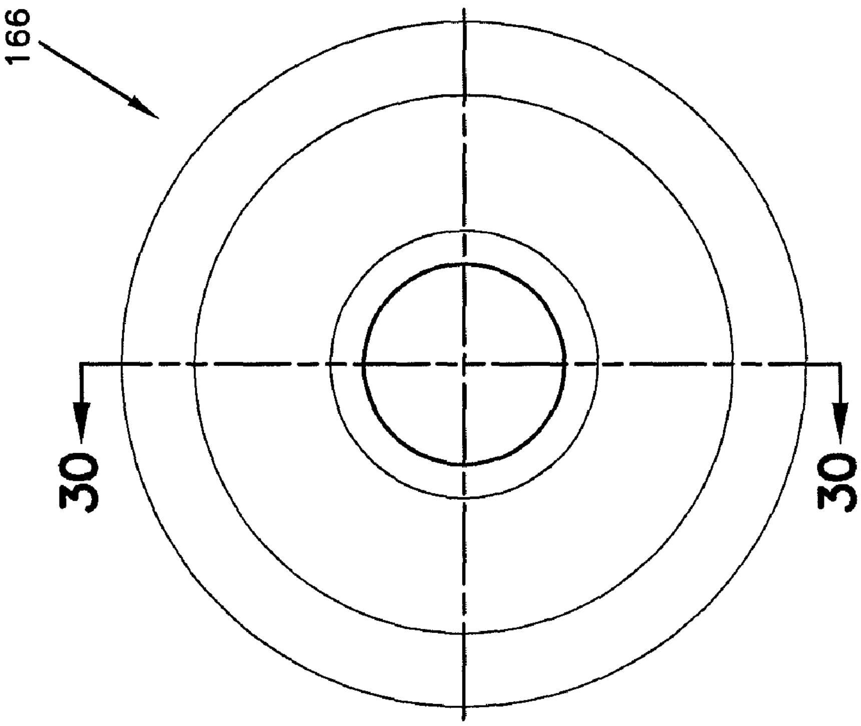
FIG. 29 is a front view of a collar member of the rod assembly shown in FIG. 26.
Figure 32:
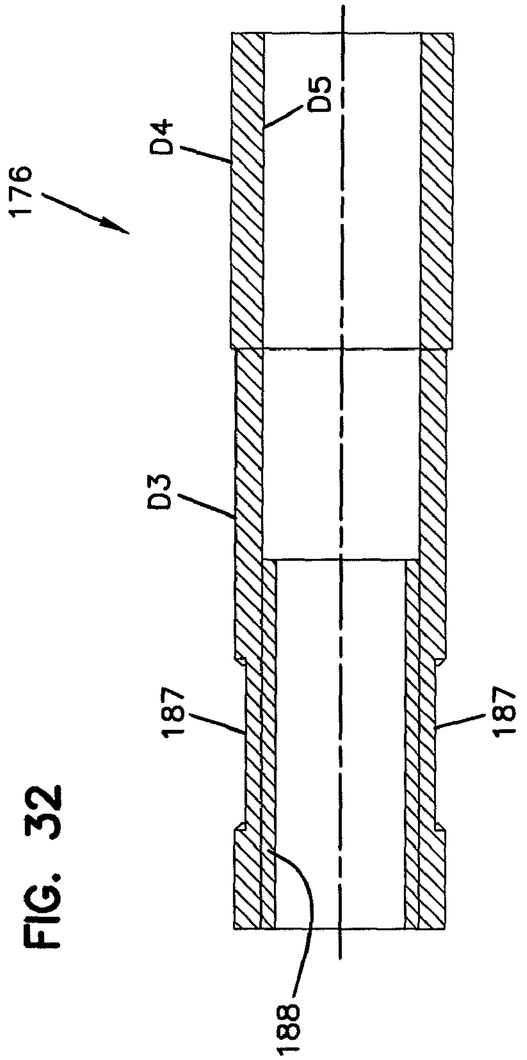
FIG. 32 is a cross-sectional view of the coupler shown in FIG. 31 taken along cross-sectional indicators 32-32.
Figure 31:
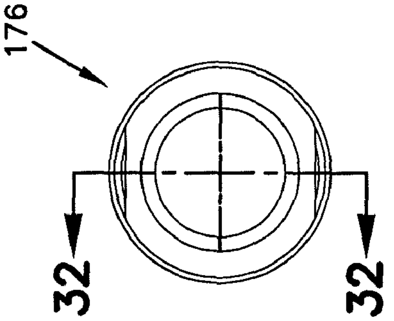
FIG. 31 is an end view of a coupler of the rod assembly shown in FIG. 26.

The inner collar member 166 is shown in further detail with reference to FIGS. 29 and 30. The outer collar member 195 can be configured with the same or similar size and shape as the inner collar member 166. The collar members 166, 195 have an outer perimeter size that is greater than the inner diameter of the accumulator shaft apertures 76, 78. Rod 168 shown in FIG. 26 includes a pair of motor fastening apertures 178, a ring slot 180 sized to receive the locking ring 189, a threaded portion 182 for threaded engagement with the coupler 176, and a keyed end portion 184. The rod 168 has a length sufficient to extend from within the refrigerated cavity 50 into the equipment cavity 54.

Figure 28:
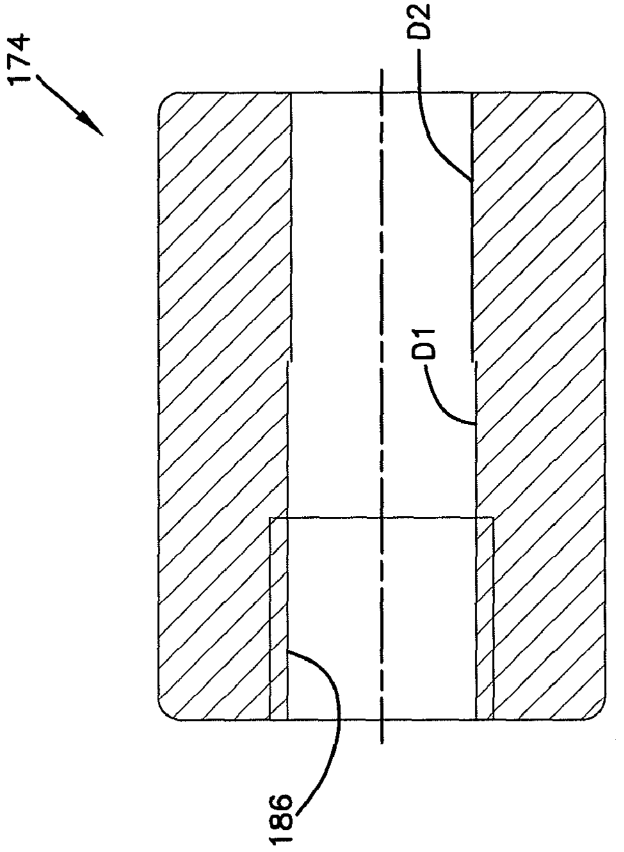
FIG. 28 is a cross-sectional view of the coupler nut as shown in FIG. 27 taken along cross-sectional indicators 28-28.
Figure 27:
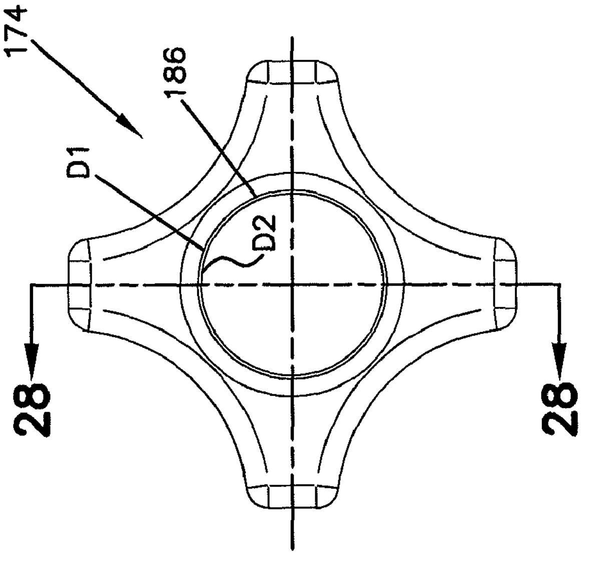
FIG. 27 is an end view of a coupler nut of the rod assembly.
Figure 34:
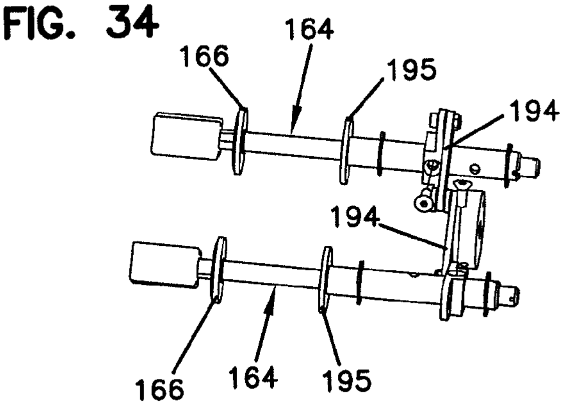
FIG. 34 is a perspective view of the rod assemblies and linking members of an accumulator assembly in accordance with principles of the present disclosure.
Figure 35:
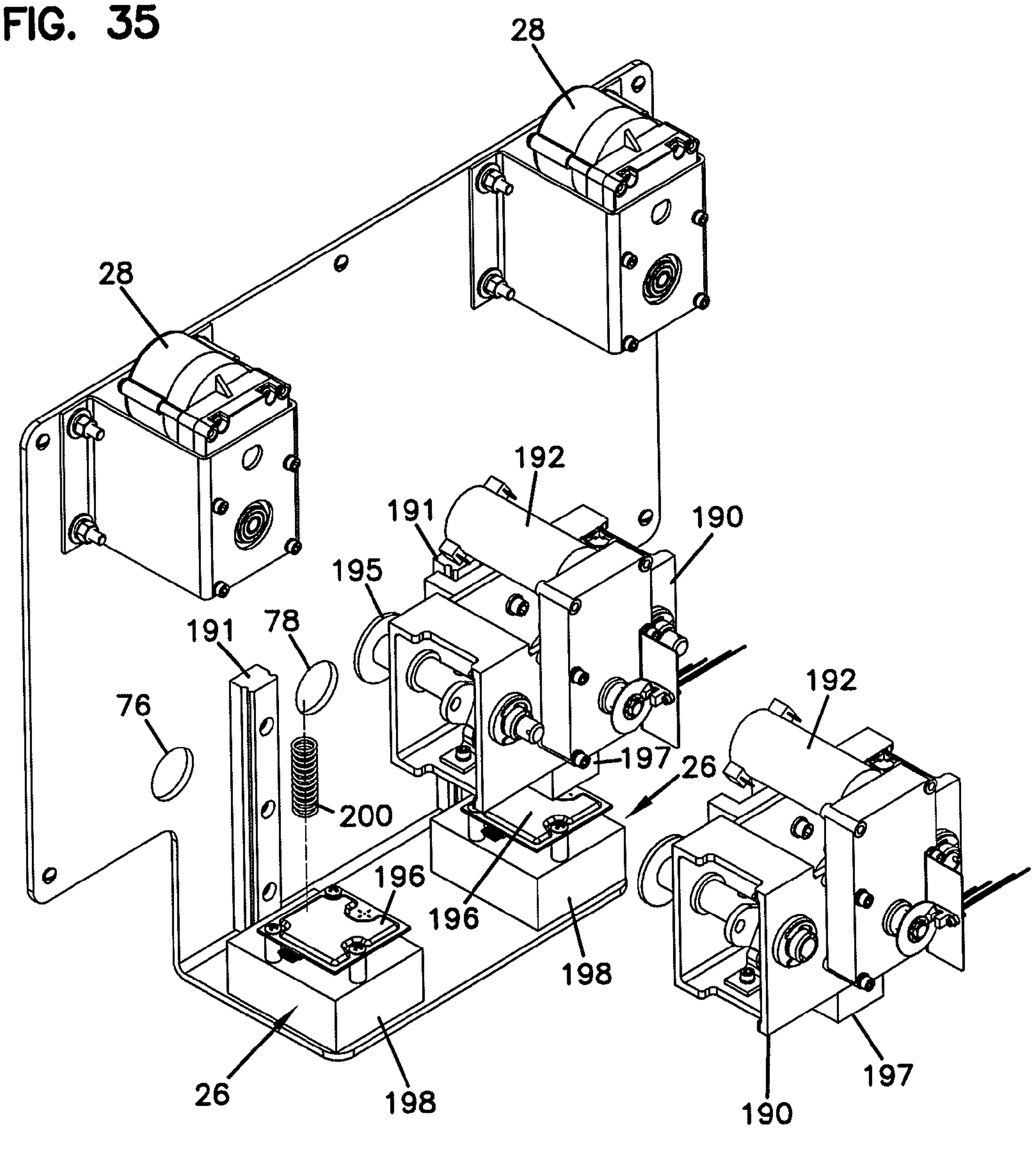
FIG. 35 is a partial exploded rear perspective view of the features shown in FIG. 33.

The coupler nut 174 is shown in further detail with reference to FIGS. 27 and 28. The coupler nut includes a first inner diameter D1, a second inner diameter D2, and an internal threaded portion 186. The inner diameter portion D2 is sized to receive the first outer diameter portion D3 of the coupler 176 (see FIG. 32), but is smaller than a second outer diameter portion D4 of the coupler 176. The washer 170 has an internal diameter that is smaller than an outer diameter D6 (see FIG. 26) of the rod 168. Thus, when the rod assembly 164 is assembled in the order of components shown in FIG. 26, the collar member 166 and coupler nut 174 are retained between the rod 168 and the coupler 176 as shown in FIG. 34.

The coupler nut 174 includes structure on its exterior surface that provides for easy handling and rotation of the coupler nut by an operator to secure the first and second door assemblies 152, 154 to the actuator assemblies 20, 22 without the use of tools.

The coupler 176 includes a cutout 187, a threaded portion 188, and an internal diameter portion D5. The cutout 187 is positioned with cutout features on opposing outer surface sides of the coupler 176. The cutouts 187 permit a wrench or other tool to rotate the coupler 176 relative to the shaft 168. The threaded portion 188 is configured to mate with the threaded portion 182 of the rod 168. The internal diameter portion D5 is sized to receive that end of shaft 158 that includes the keyed bore 160. The keyed end portion 184 of the rod 168 extends through the internal cavity of the coupler 176, past the threaded portion 188, and into the keyed bore 160 of the doors 156 thereby providing a fixed rotational connection between the first and second door assemblies 152, 154 with the rod assemblies 164. The threaded connection between the coupler nut 174 and the threaded portion 162 on the first and second door assemblies 152, 154 provides a fixed axial connection between the first and second door assemblies 152, 154 and the rod assemblies 164. The coupler nut 174 is positioned within the refrigerated cavity 50 and configured for easy operator engagement to make the necessary threaded connection between the door assemblies 152, 154 and the rod assemblies 164 without the use of tools (see FIGS. 20-22).

Figure 20:
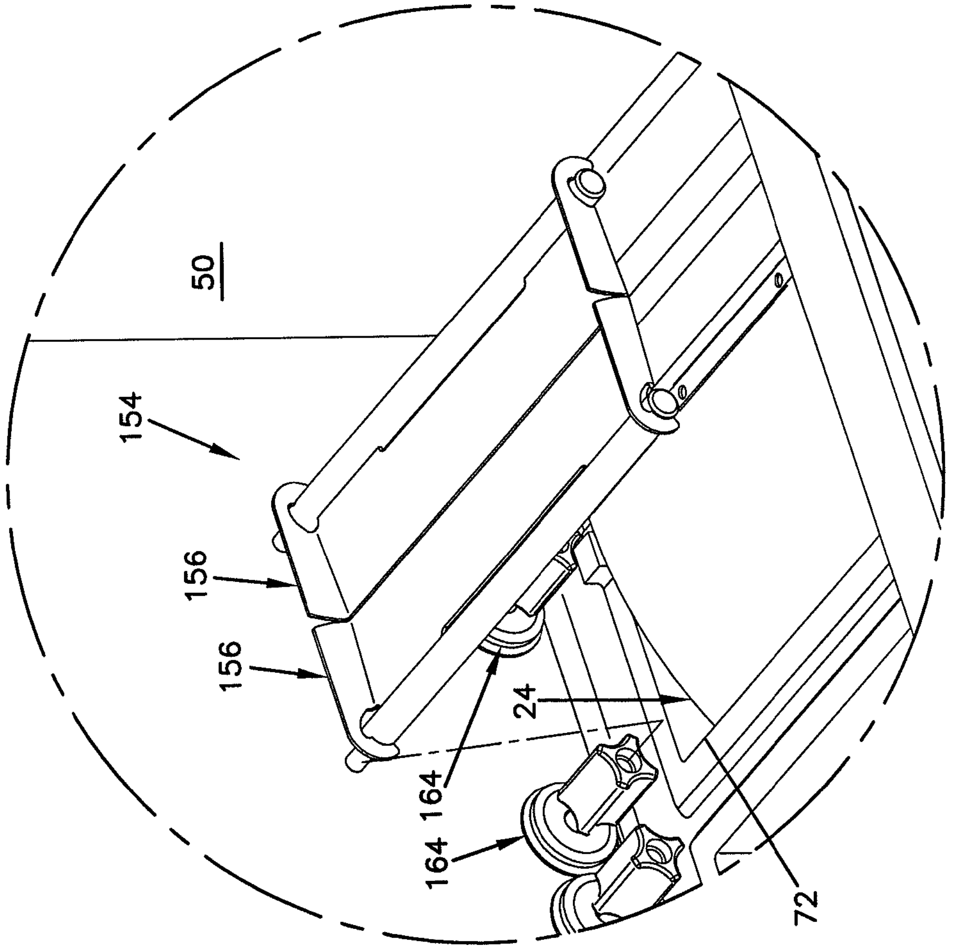
FIG. 20 is a front perspective view of a door assembly of the accumulator assembly in alignment with the rod assemblies.
Figure 21:
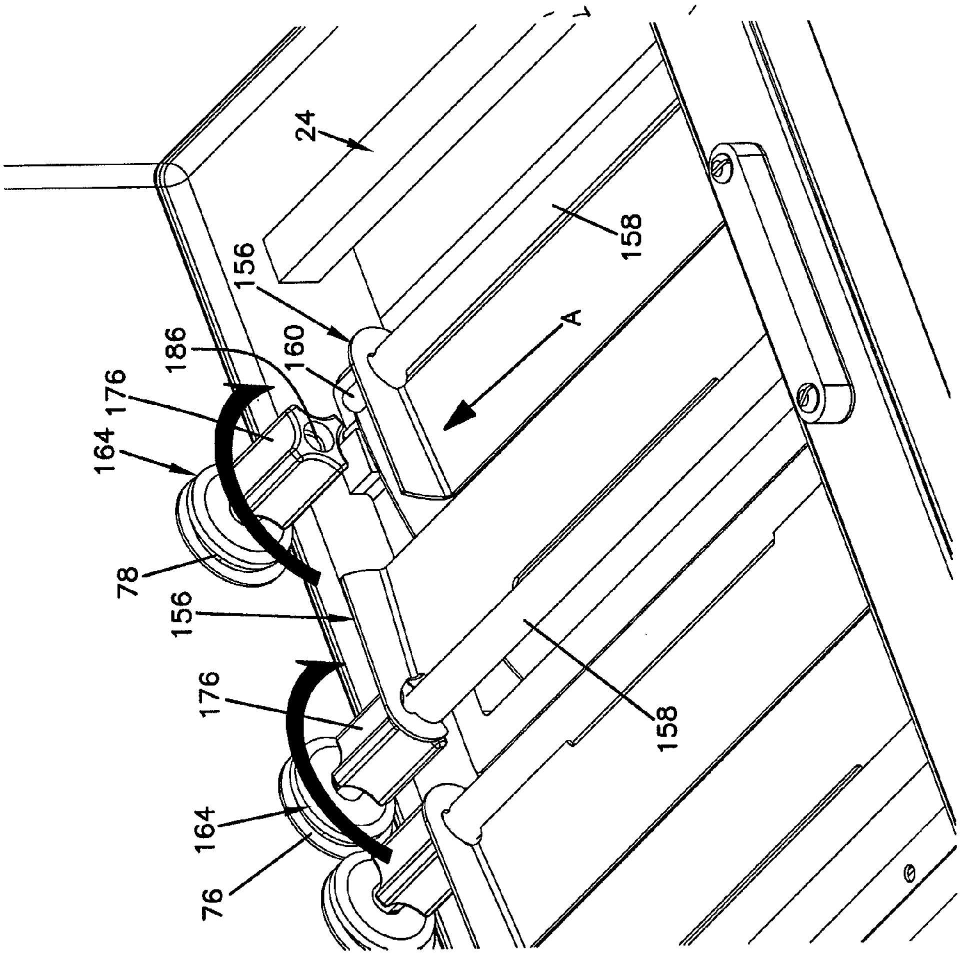
FIG. 21 is a front perspective view of the door assemblies being secured to the rod assemblies.
Figure 22:
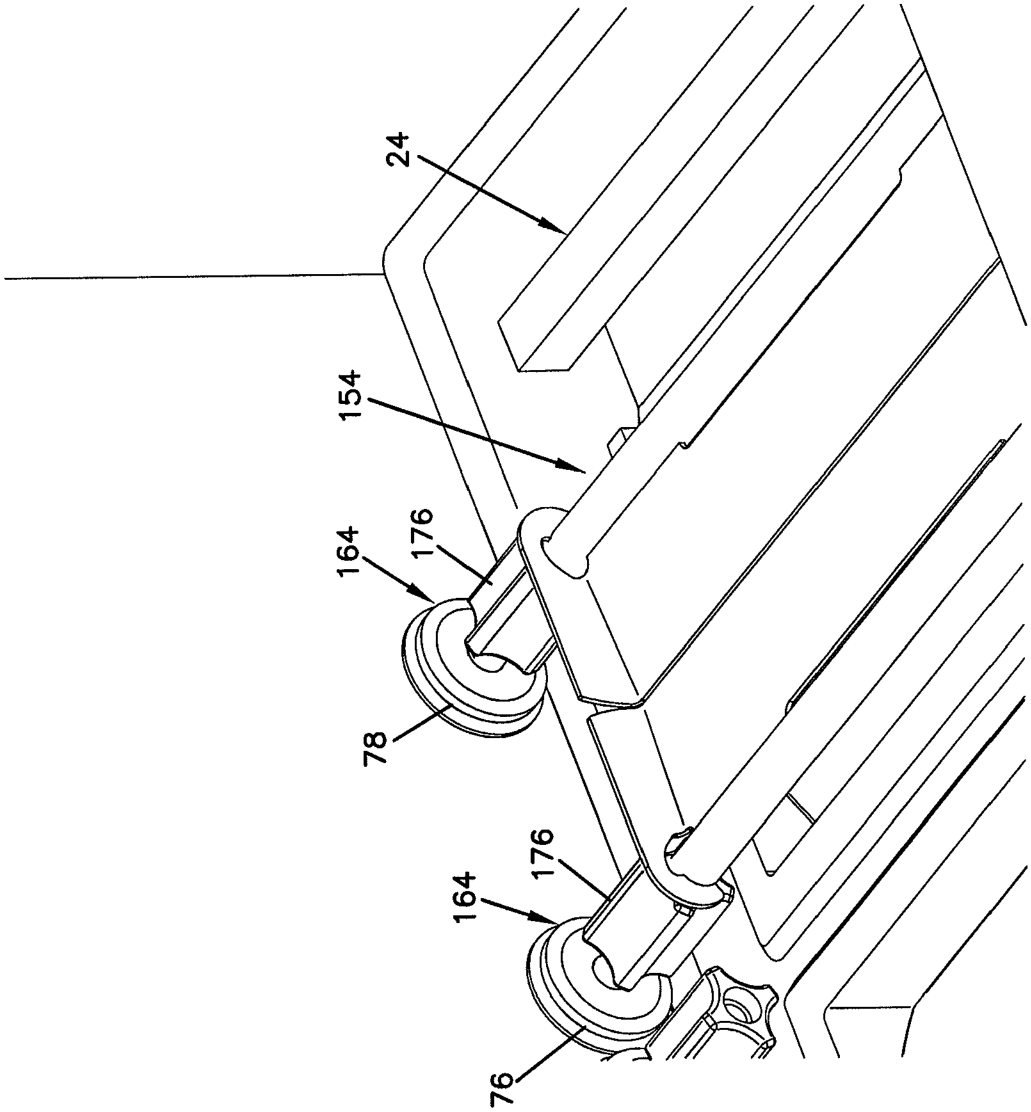
FIG. 22 is a front perspective view of the door assembly mounted to the rod assemblies.

FIG. 20 illustrates the door assembly 154 positioned in the refrigerated cavity 50 and prepared for mounting to the rod assemblies 164. FIG. 21 illustrates the door assembly 154 being secured to a pair of rod assemblies 164 by insertion of that end of the shaft 158 having the keyed bore 160 in the direction A into an open end of the coupler nut 174, and then rotation of the coupler nut to provide threaded engagement between the threaded portion 186 of the coupler nut with the threaded portion 162 of the door assembly 154. FIG. 22 illustrates the door assembly 154 in a completed attached configuration with the rod assemblies 164.

Figure 33:
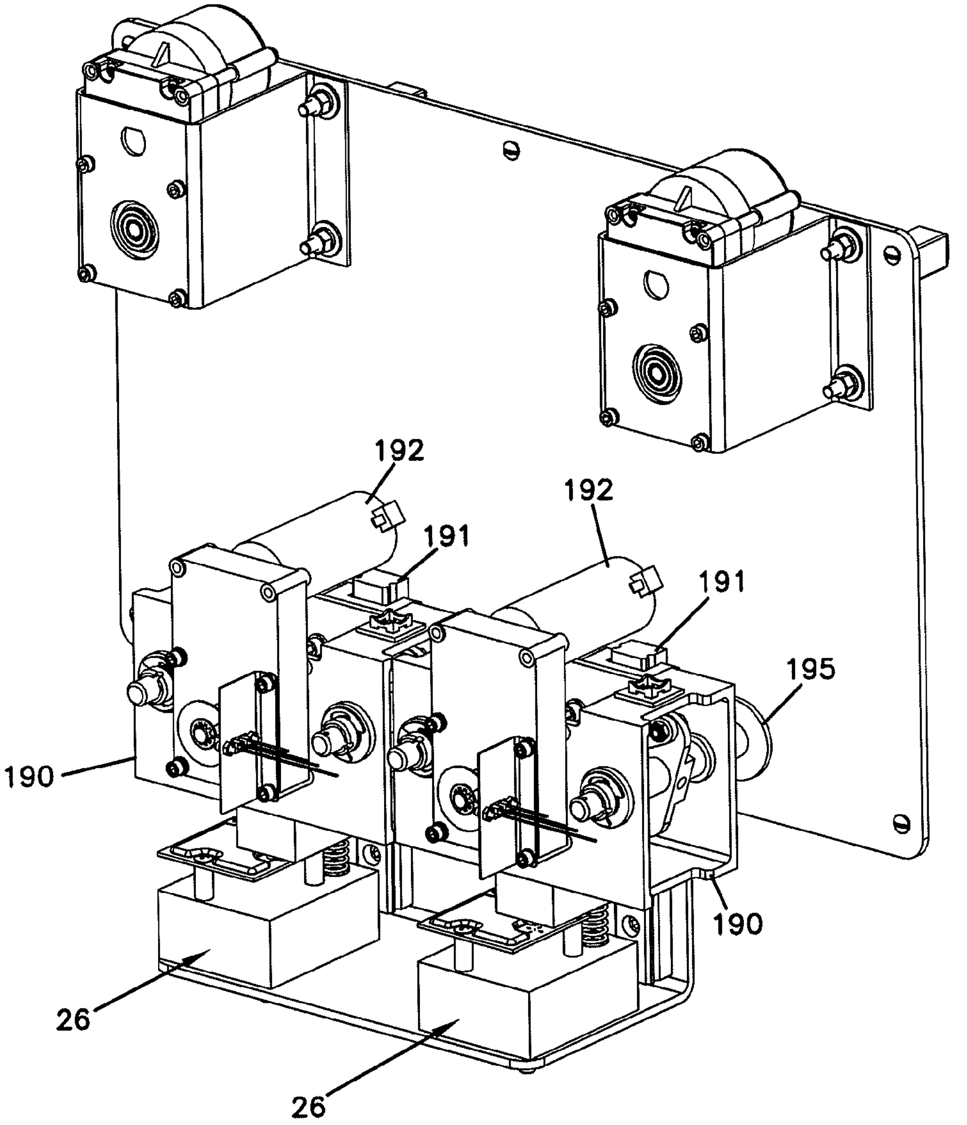
FIG. 33 is a rear perspective view of drum motors, weighing system, and accumulator motor and linking system of the food dispenser assembly shown in FIG. 3.

Referring now to FIGS. 32-37, further description is provided related to actuation of the first and second door assemblies 152, 154 to provide opening and closing of the doors 156 and weighing of food collected in the accumulator bin 146. FIG. 34 illustrates two rod assemblies 164 coupled together with a set of linking members 194. The linking members 194 provide for simultaneous rotation of each of the rod assemblies 164 upon rotation via a single actuator motor 192. FIG. 33 illustrates a separate actuator motor 192 associated with each of the pair of rod assemblies 164 used for the first and second door assemblies 152, 154. The accumulator motors 192 are coupled to the rod assemblies 164 via the linking members 194 and the motor fastening apertures 178 on each of the rods 168. Thus, the use of the linking members 194 reduces the number of actuator motors required and ensures simultaneous rotation of each pair of rod assemblies 164 for each of the door assemblies 152, 154.

Figure 37:
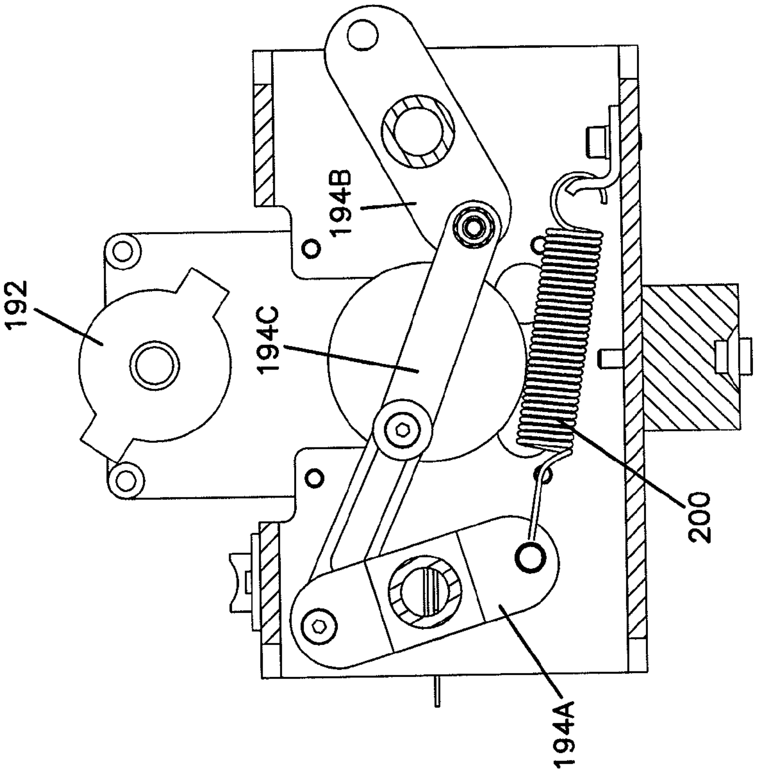
FIG. 37 is a cross-sectional view of the features shown in FIG. 36 taken along cross-sectional indicators 37-37.

One or both of the doors 156 for each of the door assemblies 152, 154 can be coupled to a biasing member that rotates the doors 156 from the open position back into the closed position. FIGS. 36 and 37 illustrate a biasing member 200 coupled to one of the linking members 194*a*, 194*b*, 194*c*. Because the linking members 194*a-c* couple together the rod assemblies 164 and doors 156 of a given accumulator assembly 20, 22, a biasing member 200 operable to rotate closed a single door 156 results in the closing of both doors 156 of the accumulator assembly. The biasing member 200 can be used in addition to or in place of the motors 192 to retract the doors into the closed position.

The actuator motors 192, linking members 194 and the ends of the rod assemblies 164 extending into the equipment cavity 54 are all connected together and supported on a support frame 190. The support frame 190 is movable up and down on mounting brackets 191. The mounting brackets 191 include a second sensor member 197 on a bottom side thereof, which when moved relative to a first sensor member 196 of a weighing system 26 results in a signal indicative of an amount of weight held within the accumulator bin 146 and supported on first and second door assemblies 152, 154. The weighing systems 26 further include a sensor mount 198 that supports the first sensor member 196, and a biasing member 200 that biases the support frame 190 into a vertically upward position.

The weighing systems 26 are configured as non-contact weighing systems in that the accumulator bins 146 supported on the first and second door assemblies 152, 154 and the rod assemblies 164 are all free to move vertically up and down with the weight measurement being taken as a result of a change in the relative spacing between the first and second sensor members 196, 198. The non-contact weighing system can have certain advantages over other types of weighing systems, such as load cells. Load cells typically are relatively expensive and susceptible to higher incidence of failure. A non-contact weighing system such as the one disclosed herein can be made relatively robust using relatively inexpensive components. Further, a non-contact weighing system may also be less susceptible to long-term wear and performance issues that can be a concern with load cells and other types of weighing systems in the refrigerated, high humidity environments that exist within a refrigerated food dispenser.

The inner and outer collar members 166, 195 can be used to limit the flow of refrigerated air within the refrigerated cavity 50 into the equipment cavity 54. The collars 166, 195 can also help reduce the amount of water or other liquids that might otherwise travel between the refrigerated cavity 50 and equipment cavity 54 during, for example, cleaning of the refrigerated cavity 50. The food dispensing assembly 10 can further include a heating member 193 (see FIG. 18) associated with the accumulator shaft apertures 76, 78. The heating member 193 can be secured to a panel of the cabinet 12, such as within the rear panel 58 of the cabinet, and extending adjacent to each of the apertures 76, 78. The heating member 193 helps maintain a temperature that prevents the formation of frost, ice, or other undesired formations that could inhibit the free vertical movement of the rod assemblies 164 within the apertures 76, 78 that would otherwise adversely alter the performance of the weighing system 26.

The Flap Doors

The flap door 24 associated with each of the dispensing apertures 72 of the cabinet 12 are further shown and described with reference to FIGS. 14-17. The flap door 24 includes an axle 134, a counter weight 136, and a frame 138. The frame 138 includes a contact portion 140, a counter weight support arm 142, and can further include a coating material 144. The axle 134 is secured to the frame 138 at a location between the contact portion 140 and the counter weight support portion 142. The axle 134 can be secured to the frame with fasteners such as, for example, screws, bolts, or rivets, or other fastening methods or structures such as, for example, braising, welding, and adhesives. The counter weight 136 is shown extending across substantially the entire width of the flap door 24. The counter weight 136 can be secured to the frame 138 using, for example, any of the attachment devices or methods and materials listed above for the attachment of the axle 134 to the frame 138.

The contact portion 140 of the frame 138 includes a curved portion having a radius of curvature. As shown in FIG. 13, the curved structure of the contact portion 148 provides for closure of the dispense aperture 72 when the flap door 24 is in the closed position with the counter weight 136 positioned adjacent to the bottom wall 62 of the refrigeration cavity 50. The curved structure of the contact portion 140 also provides for removal of the contact portion 140 from the path traveled by food being dispensed from accumulator bin 146 to the food basket 40. In other embodiments, the curved configuration of the contact portion 140 can be replaced with other shapes such as a generally planar shape that provided other advantages in addition to opening and closing of the dispense aperture 72.

The flap door 24 is configured to move from the open position shown in FIG. 13 (associated with door assembly 152) to the closed position shown in FIG. 13 (associated with door assembly 154) automatically upon closing of the doors 156. When in the open position, the counter weight 136 has a position and a relative weight compared to the contact portion 140 such that the counter weight moves toward the bottom wall 62 to rotate the flap door 24 in the direction D shown in FIG. 13 towards the closed position. The size and configuration of the frame 138 and counter weight 136 can vary depending on several factors. For example, the coating 144 can completely or at least partially encapsulate the contact portion 140 of the frame 138. The thickness and typed of material used for the coating 144 can vary the amount of weight associated with that portion of the flap door on one side of the axle 134. The counter weight 136 typically has a weight and is positioned at a distance relative to the axle 134, which is defined by a length of the counter weight support portion 142, that provides the automatic return of the flap door from the open position to the closed position when the doors 156 return to the closed position. The coating 144 can be mounted to the frame 138 using, for example, compression molding of a material such as, for example, silicone rubber.

The flap door 24 is configured to operate without the use of additional motors or mechanical assistance (e.g., springs or actuators) outside of the forces applied to the flap door 24 via the opening of doors 156 of the first and second door assemblies 152, 154. This relatively simply design reduces the number of parts, in particular mechanical or motorized parts, required for the food dispenser assembly 10. Further, the flap door 24 can be easily mounted and removed from the cabinet 12 without mechanically detaching the flap door 24 from another object, which provides increased ease in cleaning and performing maintenance.

The Filter Assembly

Now referring to FIGS. 1 and 39-41, the filter assembly 38 is shown and described in further detail. The filter assembly 38 includes a door 202 having a plurality of vent openings 204, a slot 206 defined in the door 202, a plurality of follower members 208 extending into the slot 206, and a filter 210. Portions of the door 202 are configured to slide into and out of the air intake chamber 96 of the support stand 14. The followers 208 are secured to the support stand 14. Positioning of the followers 208 within the slot 206 provide a positive connection between the door 202 and the support stand 14 while permitting a sliding action for opening and closing the door 202. With the door 202 in the open position, the filter 210 can be mounted in the door 202 on an interior side of the door opposing the vent openings 204. With the door 202 in a closed position as shown in FIG. 1, air is drawn through the vent openings 204 and the filter 210 into the air intake chamber 96 for use by the refrigeration system 32.

The filter assembly 38 is configured for easy accessibility by an operator, thus improving the chances of the filter being replaced and maintained on a regular basis. Providing a regularly maintained filter at the air intake for the refrigerator system 32 can extend the useful life of the refrigeration system 32 and reduce the amount of maintenance required for the refrigeration system 32. Further, the configuration of the filter assembly 38 provides for replacement and/or access to the filter 210 without the use of any tools. If desired, the door 202 can be secured in the closed position using, for example, an interference fit, or other fastening structure. However, it is anticipated that the door 202 can maintain the closed position without such additional fastening devices, thereby eliminating the need for tools to access the filter 210.

Software Considerations

The control system 36 can be configured for improved detection of an empty state of the hoppers 16, 18 and problems associated with the weighting systems 26. Early detection of these conditions can be important. In both of these conditions, apparent progress in weighing the product being accumulated in the accumulator bins 146 ceases from the point of view of the control system 36. If the hopper is actually empty, early detection means that the operator can respond faster to refill the hopper, resulting in slightly less down time due to the low hopper condition. If the weighing system is disabled or not functioning correctly, early detection can prevent significant inconvenience caused as the hopper continues to dispense food to the accumulator bin 146 in an attempt to achieve a target weight when in actuality the target weight has already been attained.

Figure 42:
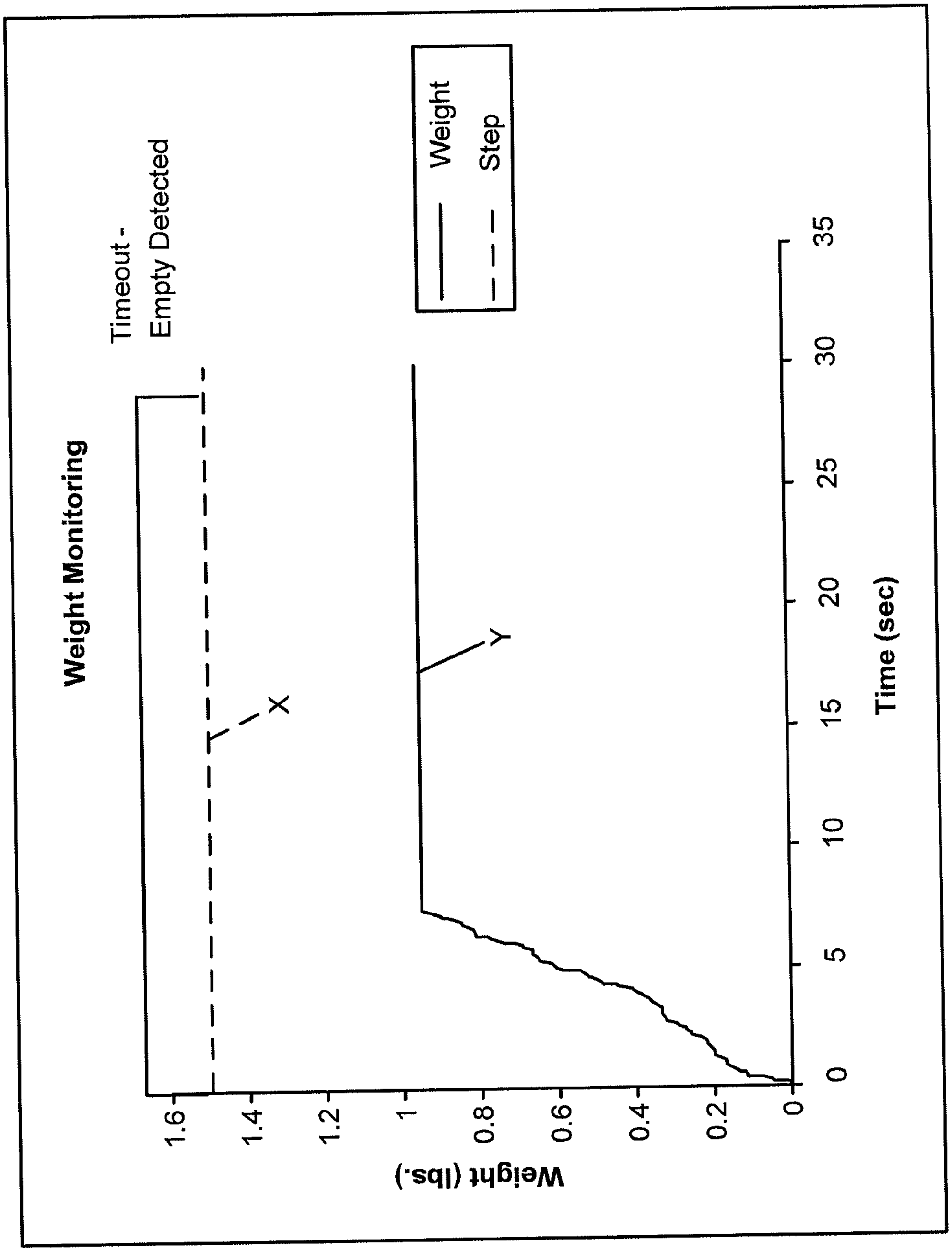
FIG. 42 is a graph illustrating example weighing cycles and monitoring in a food dispensing assembly.

A traditional method of detecting an empty hopper condition includes placement of a time out on the weighing process that stops hopper dispensing in the event the targeted weight is not achieved in a reasonable amount of time. FIG. 42 illustrates this traditional method of detection. The line X represents the target weight. The bracket above the line X illustrates the time frame before a timeout (shut down) of the system occurs, which represents the maximum time it should take to reach the target weight. In the examples shown in FIG. 42, progress in reaching the targeted weight halts just short of one pound. The problem associated with the scenario of FIG. 42 is that the timeout function does not occur until the mark of about 30 seconds which is more than 20 seconds from when the dispensing of food actually ends. It is typical that a normal weighing cycle takes from about 8 to about 20 seconds, depending on the condition of the food being dispensed from the hoppers into the accumulator bin. The timeout must therefore be set to a time safely longer than this (typically 30 to 40 seconds). This is usually at least three to four times longer than the typical time to achieve the weight (usually only 8 to 12 seconds). Therefore, if the progress in reaching the target weight is caused by the weighing system being disabled, as much as four times too much product could be dispensed from the hopper before the dispensing system is timed out (i.e., turned off). As a result, there is a significant potential of jamming the dispensing mechanism and requiring a time consuming cleanup to restore operations with the software system shown in FIG. 42.

A new software system has been developed in association with the food dispensing assembly 10 described above. The new system sets a series of intermediate goals for the weighing process to achieve during dispensing from the hopper. Because these goals are much smaller than the total target weight, the corresponding time out can also be a much smaller amount of time. When a normal weighing process achieves one of the intermediate goals, the timeout is reset and the process continues towards the next goal. If measuring progress is halted by an empty hopper condition or interference with the weighing system, the next intermediate goal will not be achieved and a shorter timeout period will result in stop of the dispensing process typically in a much shorter time period than that associated with the system of FIG. 42. Because the timeout period is shorter, it is possible to detect an empty hopper or problems with the weighing system before a normal weighing cycle would complete (i.e., the system of FIG. 42), thus the consequences are much less severe. In fact, the timeout may occur before the normal cycle would have stopped, enabling the dispensing to simply continue where it left off without further cleanup once the hopper has been refilled or the weighing system repaired.

Figure 43:
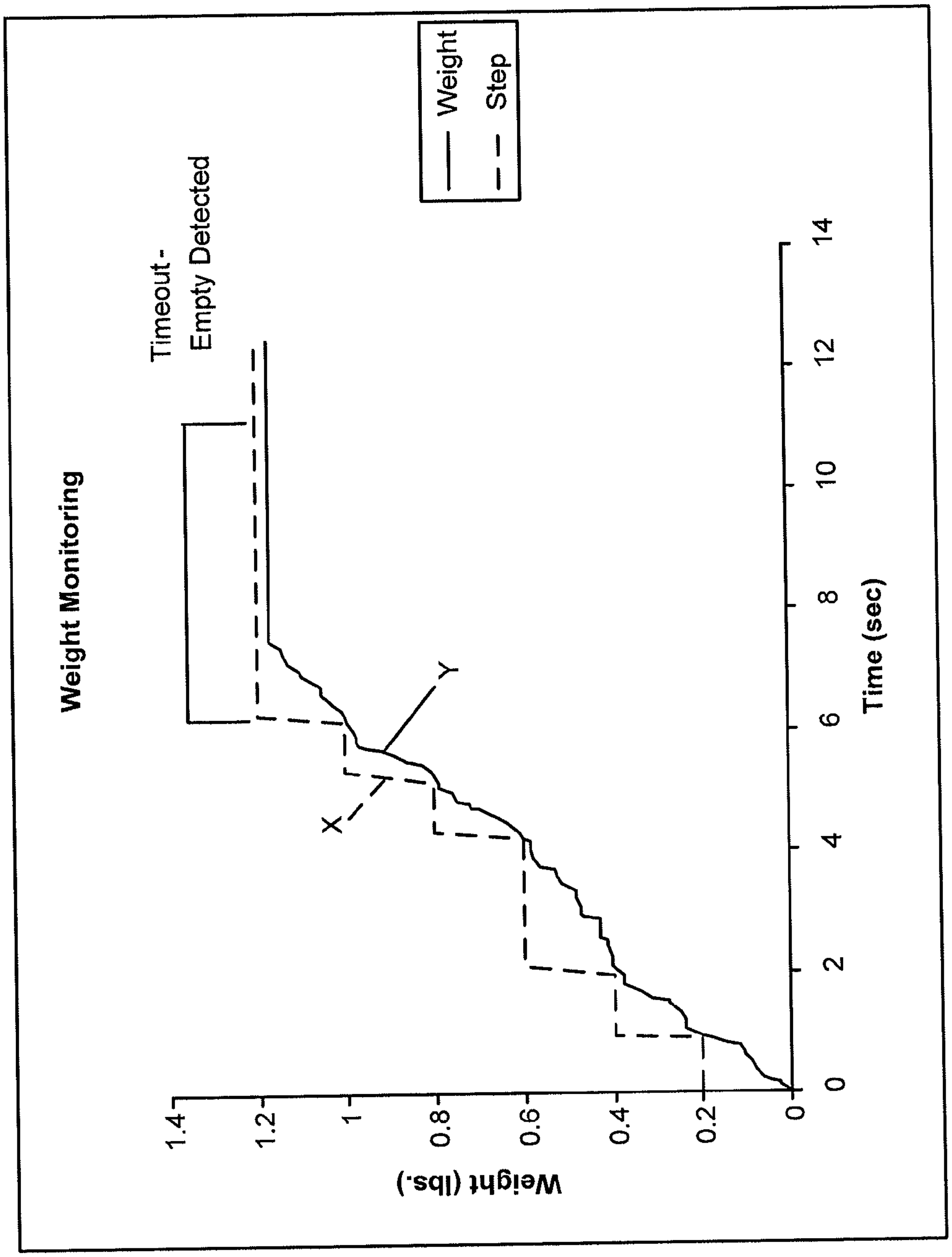
FIG. 43 is a graph illustrating another example weight monitoring system in accordance with principles of the present disclosure.

FIG. 43 illustrates one example configuration of this new system. The number of intermediate steps, the duration of each step, and other variables associated with the system can be varied as needed depending on, for example, the type of food being dispensed, the amount of food being dispensed, and other considerations.

The control system 36, which operates the software system described with reference to FIG. 43 is stored in the controller cavity 52. The control system 36 can also be used for other features of the food dispenser either automatically or through the operator control panel 34. The controller can include memory and a microprocessor for preprogramming of the food dispenser for certain types and sizes of food articles. The controller can (for example, using the operator control panel 34) control the temperature within the refrigerated cavity 50, provide signals when the amount of food articles in the hopper reaches a certain level, or automatically dispense food when a basket 40 is brought into the dispense position. Many other control functionality options can be possible with the controller and the operator control panel 34 within the scope of the present disclosure.

Materials and Other Considerations

The various features described herein can be made from different materials depending on the purpose of that feature and whether that feature is exposed to food articles. For example, most of the features that are in direct contact with food articles, such as the hopper and accumulator housing, are made from a sterile, easy to clean material such as a polymer-based material. Some polymer-based materials also act as an insulator to help maintain the predetermined temperature range within cabinet 12. For example, portions of the accumulator assemblies 20, 22 can extend out of cabinet 12 in the direction of the baskets 40 supported by lower frame structure 14. Some types of materials with high heat conduction can transfer the heat absorbed from the outside air into the freezer cabinet or to the food articles held by the flap doors 24. In contrast, materials with high insulating properties and low heat conduction help create a temperature barrier between the outside and inside of the cabinet 12.

Other features of the food dispensing assembly 10 can be made of metals and metal alloys such as stainless steel that are corrosion resistant and easy to clean, while some features that are not exposed to food articles, such as the mounting plate assembly and some features of the hopper support assembly, can be made of any suitable material in order to perform their intended function.

Conclusion

One aspect of the present disclosure relates to a food dispensing apparatus that includes a refrigerated cabinet, a first hopper, a first accumulator assembly, and a flap door. The cabinet includes a dispense aperture. The first hopper is positioned in the cabinet and configured to hold food articles. The first accumulator assembly is positioned vertically below the first hopper and includes an accumulator bin and at least one door assembly. The accumulator bin is positioned in the cabinet and arranged to receive food articles dispensed from the first hopper. The door assembly is positioned within the cabinet and configured to retain the food articles in the accumulator bin. The door assembly is actuatable between an open position and a closed position. The flap door is positioned adjacent to the door assembly and is movable between a closed position substantially sealing closed the cabinet dispense aperture, and an open position wherein the cabinet dispense aperture is open for food articles to pass there through.

One aspect of the present disclosure relates to a food dispensing apparatus that includes a refrigerated cabinet, a first hopper, a first accumulator assembly, and a sensor assembly. The cabinet includes a dispense aperture. The first hopper is positioned in the cabinet and configured to hold food articles. The first accumulator assembly is positioned vertically below the first hopper and includes an accumulator bin and at least one door assembly. The accumulator bin is positioned in the cabinet and arranged to receive food articles dispensed from the first hopper. The door assembly is positioned within the cabinet and configured to retain the food articles in the accumulator bin. The door assembly is actuatable between an open position and a closed position. The sensor assembly is configured to generate a control signal upon recognition of a food article receiving container positioned in a dispense position, wherein the dispense position oriented vertically below the food article receiving container when in the dispense position. The food article receiving container is moveable from a storage position to the dispense position by lifting a portion of the food article receiving container and moving the food article receiving container rearward relative to the cabinet.

A further aspect of the present disclosure relates to a method of dispensing food articles from a food dispensing assembly. The food dispensing assembly includes a refrigerated cabinet, a hopper, an accumulator assembly, a weighing system, a cabinet, and a food article receiving container. The cabinet includes a dispense aperture. The accumulator assembly includes an accumulator bin and a door assembly. The method steps include loading the articles into the first hopper, maintaining a predetermined refrigerated temperature range in the cabinet, moving food articles from the hopper into the accumulator bin, and weighing the food articles retained in the accumulator bin. The method steps also include moving the food article basket from a storage position to a dispense position to generate a dispense signal, and opening the door assembly in response to the dispense signal to dispense the food articles from the accumulator bin, out of the dispense aperture, and into the food article receiving container.

While a particular embodiment of the present disclosure has been described with respect to its application for dispensing articles, such as frozen french fries, onion rings, and protein products such as chicken tenders, etc., it will be understood by those of skill in the art that the present disclosure is not limited by such application or embodiment for the particular components disclosed and described herein. It will be appreciated by those skilled in the art that other configurations that embody the principles of the present disclosure and other applications therefore can be configured within the spirit and intent of the present disclosure. The example configurations described herein are provided as only example embodiments that incorporate and practice the principles of the present disclosure. Other modifications and alterations are well within the knowledge of those skilled in the art and are to be included within the broad scope of the appended claims.

We claim:

1. A support stand of a food dispensing apparatus, the support stand comprising:

a basket tray having a basket support surface, the basket support surface arranged and configured to support a food basket in at least a storage position and a dispense position;

a shelf elevated from the support surface of the basket tray and arranged and configured to support at least a portion of the food basket thereon when the food basket is in the dispense position; and a position sensor arranged within the shelf to detect when the food basket is positioned in the dispense position, wherein at least a portion of the food basket is positioned vertically above the shelf.

2. The support stand of claim 1, wherein when the food basket is in the storage position a front surface of the food basket is adjacent a front surface of the shelf to block the food basket from being detected by the position sensor, and wherein when the food basket is in the dispense position, at least the portion of the food basket is positioned vertically above the shelf to permit the food basket to be detected by the sensor.

3. The support stand of claim 1, wherein the shelf further comprises a sensor window.

4. The support stand of claim 3, wherein the position sensor detects the presence of the food basket through the sensor window.

5. The support stand of claim 4, wherein the position sensor is an inductive sensor.

6. The support stand of claim 5, wherein the inductive sensor detects the presence of at least the portion of the food basket when the food basket is within about 1 inch of the sensor window.

7. A food dispensing apparatus comprising:

a refrigerated cabinet configured to hold food articles, the refrigerated cabinet including a dispense aperture sized to permit the food articles to pass through;

a support stand configured to support a food basket to receive the food articles from the refrigerated cabinet, the support stand comprising:

a basket tray having a basket support surface arranged and configured to support a food basket in at least a storage position and a dispense position;

a shelf elevated from the support surface of the basket tray and arranged and configured to support at least a portion of the food basket thereon when the food basket is in the dispense position; and a position sensor arranged within the shelf to detect when the food basket is in the dispense position wherein at least a portion of the food basket is vertically above the shelf, to trigger dispensing of the food articles from the refrigerated cabinet into the food basket.

8. The food dispensing apparatus of claim 7, wherein the position sensor is an inductive sensor.

9. The food dispensing apparatus of claim 7, wherein a front surface of the shelf forms a stop to define an end of the support surface of the basket tray.

10. The food dispensing apparatus of claim 9, wherein the support stand further comprises a rear wall.

11. The food dispensing apparatus of claim 10, wherein the rear wall of the support stand is rearward of the front surface of the shelf.

12. The food dispensing apparatus of claim 11, wherein the position sensor is forward of the rear wall and rearward of the front surface of the shelf.

13. The food dispensing apparatus of claim 7, wherein the refrigerated cabinet further comprises:

a first hopper configured to hold the food articles within the cabinet;

a first accumulator assembly positioned vertically below the first hopper, the first accumulator assembly including:

an accumulator bin positioned in the cabinet and arranged to receive food articles dispensed from the first hopper; and at least one door assembly positioned within the cabinet and configured to retain the food articles in the accumulator bin, the at least one door assembly actuatable between an open position and a closed position; and a flap door positioned adjacent to the door assembly, the flap door movable between a closed position substantially sealing closed the cabinet dispense aperture, and an open position wherein the cabinet dispense aperture is open for food articles to pass through.

14. The food dispensing apparatus of claim 13, further comprising:

a second hopper positioned in the cabinet adjacent the first hopper, the second hopper configured to hold food articles; and a second accumulator assembly positioned vertically below the second hopper, the second accumulator assembly including:

an accumulator bin positioned in the cabinet and arranged to receive food articles dispensed from the second hopper; and at least one door assembly positioned within the cabinet and configured to retain the food articles in the accumulator bin, the at least one door assembly actuatable between an open position and a closed position.

15. The food dispensing apparatus of claim 7, wherein the position sensor is configured to generate a control signal upon detection of at least the portion of the food basket being in a dispense position.

16. The food dispensing apparatus of claim 15, wherein the food basket is located vertically below the dispense aperture when in the dispense position.

17. A method of dispensing food articles from a food dispensing assembly, the food dispensing assembly including a refrigerated cabinet, a hopper, an accumulator assembly, a weighing system, a cabinet, a basket tray, and a food article receiving container, the cabinet including a dispense aperture, the accumulator assembly including an accumulator bin and a door assembly, the method comprising the steps of:

loading the articles into the first hopper;

maintaining a predetermined refrigerated temperature range in the cabinet;

moving food articles from the hopper into the accumulator bin;

upon movement of the food article basket on a support surface of the basket tray from a storage position to a dispense position vertically below the dispense aperture, detecting with an inductive sensor the presence of the food article basket in the dispense position wherein a portion of the basket is vertically above a shelf elevated from the support surface, wherein the inductive sensor is positioned in the shelf vertically below the portion of the food article basket and generates a dispense signal; and opening the door assembly in response to the dispense signal to dispense the food articles from the accumulator bin, out of the dispense aperture, and into the food article basket.

18. The method of claim 17, wherein moving the food article basket further comprises lifting a front end of the food article basket and moving at least a portion of the food article basket over the shelf.

19. The method of claim 18, wherein the food dispensing assembly further includes a flap door configured to substantially close the dispense aperture when in a closed position, the method comprising moving the flap door into an open position when opening the door assembly, and automatically moving the flap door into a closed position when the door assembly is moved into a closed position.

20. A support stand of a food dispensing apparatus, the support stand configured to support the food basket in at least a storage position and a dispense position, the support stand comprising:

a basket tray having a basket support surface, the basket support surface arranged and configured to support a food basket;

a shelf elevated from the support surface of the basket tray arranged and configured to support at least a portion of the food basket thereon; and a position sensor arranged within the shelf to detect a presence of at least a portion of the food basket vertically above the shelf, wherein when the food basket is in the storage position a front surface of the food basket is adjacent a front surface of the shelf to block the food basket from being detected by the position sensor, wherein when the food basket is in the dispense position, at least the portion of the food basket is positioned vertically above the shelf to permit the food basket to be detected by the sensor.

21. A food dispensing apparatus comprising:

a refrigerated cabinet configured to hold food articles, the refrigerated cabinet including a dispense aperture sized to permit the food articles to pass through, the refrigerated cabinet comprising:

a first hopper configured to hold the food articles within the cabinet;

a first accumulator assembly positioned vertically below the first hopper, the first accumulator assembly including:

an accumulator bin positioned in the cabinet and arranged to receive food articles dispensed from the first hopper; and at least one door assembly positioned within the cabinet and configured to retain the food articles in the accumulator bin, the at least one door assembly actuatable between an open position and a closed position; and a flap door positioned adjacent to the door assembly, the flap door movable between a closed position substantially sealing closed the cabinet dispense aperture, and an open position wherein the cabinet dispense aperture is open for food articles to pass through;

a support stand configured to support a food basket to receive the food articles from the refrigerated cabinet, the support stand comprising:

a basket tray having a basket support surface arranged and configured to support a food basket;

a shelf elevated from the support surface of the basket tray; and a position sensor arranged within the shelf to detect when at least a portion of the food basket is vertically above the shelf to trigger dispensing of the food articles from the refrigerated cabinet into the food basket.

22. The food dispensing apparatus of claim 21, further comprising:

a second hopper positioned in the cabinet adjacent the first hopper, the second hopper configured to hold food articles; and a second accumulator assembly positioned vertically below the second hopper, the second accumulator assembly including:

an accumulator bin positioned in the cabinet and arranged to receive food articles dispensed from the second hopper; and at least one door assembly positioned within the cabinet and configured to retain the food articles in the accumulator bin, the at least one door assembly actuatable between an open position and a closed position.

23. A method of dispensing food articles from a food dispensing assembly, the food dispensing assembly including a refrigerated cabinet having a dispense aperture, a hopper, an accumulator assembly, a weighing system, a cabinet, a flap door configured to substantially close the dispense aperture when in a closed position, and a food article receiving container, the accumulator assembly including an accumulator bin and a door assembly, the method comprising the steps of:

loading the articles into the first hopper;

maintaining a predetermined refrigerated temperature range in the cabinet;

moving food articles from the hopper into the accumulator bin by lifting a front end of the food article basket and moving at least a portion of the food article basket over an elevated shelf;

upon movement of the food article basket from a storage position to a dispense position vertically below the dispense aperture, detecting the presence of the food basket with an inductive sensor positioned vertically below a portion of the food basket and generating a dispense signal;

opening the door assembly in response to the dispense signal to dispense the food articles from the accumulator bin, out of the dispense aperture, and into the food article receiving container; and moving the flap door into an open position when opening the door assembly, and automatically moving the flap door into a closed position when the door assembly is moved into a closed position.

24. The method of claim 23, wherein the food dispensing assembly further includes a sensor assembly, and generating a dispense signal includes activating the sensor assembly by positioning the food article receiving container in the dispense position vertically above the sensor assembly.

* * * * *